United States Patent
Cheng et al.

(10) Patent No.: US 11,375,431 B2
(45) Date of Patent: Jun. 28, 2022

(54) ZONE BASED RELAY CONTROL

(71) Applicant: QUALCOMM Incorporated, San Diego, CA (US)

(72) Inventors: Hong Cheng, Bridgewater, NJ (US); Kapil Gulati, Hillsborough, NJ (US); Zhibin Wu, Sunnyvale, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 16/537,388

(22) Filed: Aug. 9, 2019

(65) Prior Publication Data

US 2020/0100167 A1 Mar. 26, 2020

Related U.S. Application Data

(60) Provisional application No. 62/734,901, filed on Sep. 21, 2018.

(51) Int. Cl.
*H04W 4/21* (2018.01)
*H04W 40/20* (2009.01)
(Continued)

(52) U.S. Cl.
CPC .......... *H04W 40/20* (2013.01); *H04W 4/021* (2013.01); *H04W 4/40* (2018.02); *H04W 88/04* (2013.01)

(58) Field of Classification Search
USPC ....................................................... 370/329
See application file for complete search history.

(56) References Cited

U.S. PATENT DOCUMENTS

2005/0030202 A1 2/2005 Tsuboi
2019/0004179 A1 1/2019 Hwang et al.
(Continued)

FOREIGN PATENT DOCUMENTS

WO 2017105052 A1 6/2017
WO 2017133592 A1 8/2017

OTHER PUBLICATIONS

Intel Corporation: "Considerations on eV2X NR Design," 3GPP Draft; R1-1612007 Intel-EV2X Design, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016, Nov. 6, 2016, XP051190817, 8 pages, Retrieved from the Internet: URL: http://www.3gpp.org/ftp/tsg_ran/WG1_RL1/TSGR1_87/Docs/ [retrieved on Nov. 6, 2016] sections 4.1, 4.2.

(Continued)

*Primary Examiner* — Dang T Ton
(74) *Attorney, Agent, or Firm* — Procopio, Cory, Hargreaves & Savitch LLP

(57) ABSTRACT

A transmitting device may determine a zone identifier (ID) for the transmitting device and transmit a message including the zone ID directly to at least one receiving device. In certain aspects, a relay device may be configured to receive the message comprising a first zone ID for a transmitting device, to determine whether to relay the message based at least on the first zone ID, and if the relay device determines to relay the message, to transmit a relayed message including information reflecting the first zone ID. In certain aspects, a receiving device may be configured to identify a message comprising information indicating a first zone ID for a transmitting device, to determine whether to decode data of the message based at least on the first zone ID for the (Continued)

transmitting device, and to decode or refrain from decoding the data of the message based on the determination.

29 Claims, 14 Drawing Sheets

(51) Int. Cl.
*H04W 4/40* (2018.01)
*H04W 4/021* (2018.01)
*H04W 88/04* (2009.01)

(56) References Cited

U.S. PATENT DOCUMENTS

| 2019/0124669 | A1  | 4/2019 | Luo et al. |            |
|--------------|-----|--------|------------|------------|
| 2019/0174503 | A1* | 6/2019 | Adachi     | H04W 72/121 |
| 2020/0100167 | A1* | 3/2020 | Cheng      | H04W 40/20 |

OTHER PUBLICATIONS

International Search Report and Written Opinion—PCT/US2019/046196—ISA/EPO—dated Nov. 14, 2019.

\* cited by examiner

ZONE BASED RELAY CONTROL

CROSS-REFERENCE TO RELATED APPLICATION

This application claims the benefit of U.S. Provisional Application Ser. No. 62/734,901, entitled "Relay Control for V2X" and filed on Sep. 21, 2018, which is expressly incorporated by reference herein in its entirety.

BACKGROUND

Technical Field

The present disclosure relates generally to communication systems, and more particularly, to methods and apparatus related to relay control for vehicle-to-everything (V2X) communication, vehicle-to-vehicle (V2V) communication, enhanced V2X (eV2X) communication, or device-to-device (D2D) communication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR) and 4G Long Term Evolution (LTE) standard. 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. Aspects of wireless communication may comprise direct communication between devices, such as in V2X, V2V, and/or D2D communication. Aspects presented herein provide improvements for V2X, V2V, and/or D2D technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a transmitting device. The apparatus determines a zone identifier (ID) for the transmitting device. The apparatus generates a message including the zone ID and transmits the message directly to at least one receiving device.

In another aspect of the disclosure, a method, a computer-readable medium, and an apparatus are provided for wireless communication at a relay device. The apparatus receives a message comprising a first zone identifier (ID) for a transmitting device and determines whether to relay the message based at least on the first zone ID. If the relay device determines to relay the message, the apparatus generates a relayed message, the relayed message including first information indicating the first zone ID.

In another aspect of the disclosure, a method, a computer-readable medium, and an apparatus are provided for wireless communication at a receiving device. The apparatus identifies a message comprising information indicating a first zone ID for a transmitting device. The apparatus determines whether the message comprises a relayed message and determines whether to decode data of the message based at least on the first zone ID for the transmitting device, when the message comprises the relayed message. The apparatus then decodes or refrains from decoding the data of the message according to the determining based on the first zone ID.

Various additional aspects and features are described in the following detailed description.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
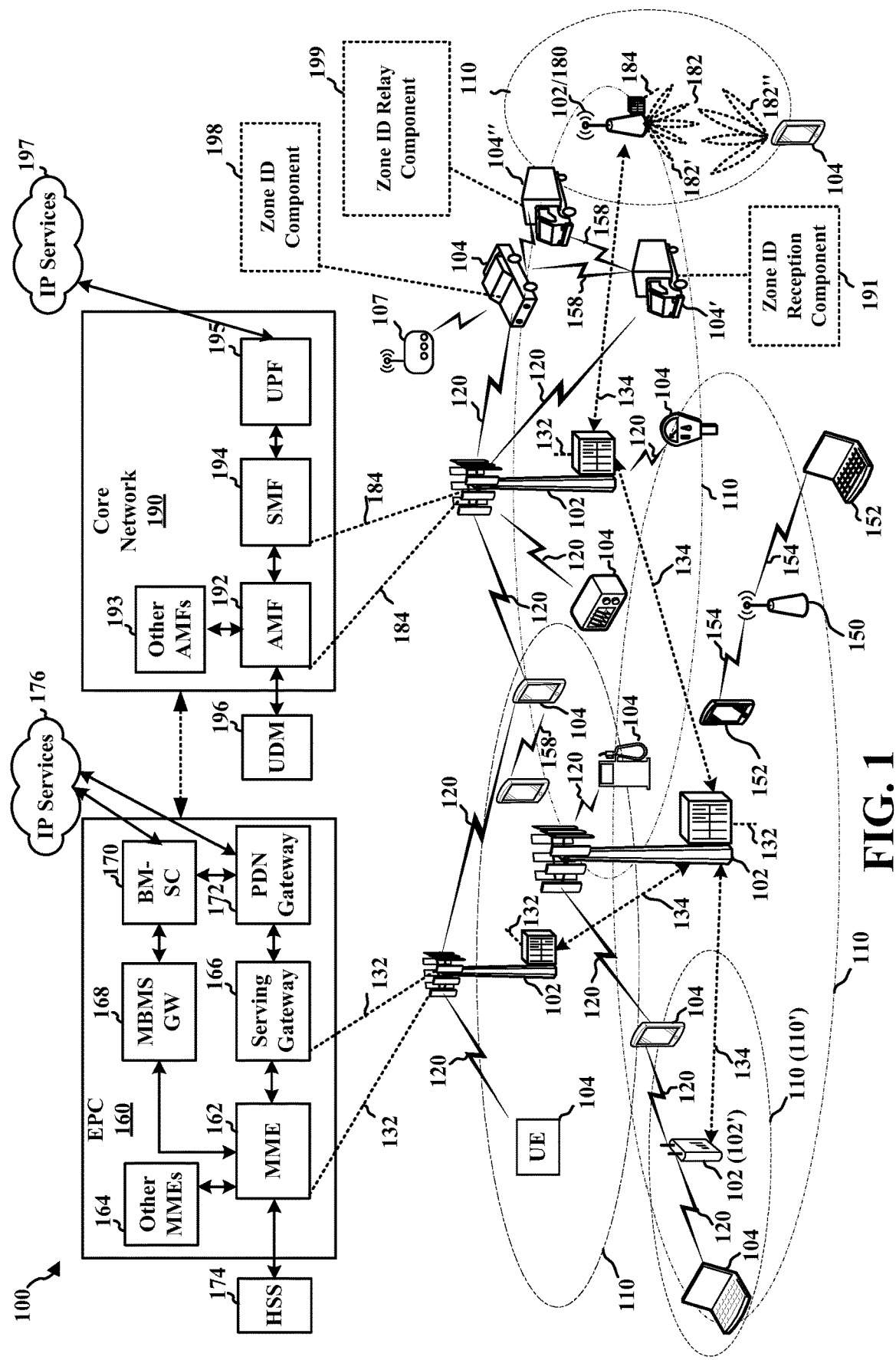
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly be applied by UE 104 or RSU 107 to communicate with another UE 104 or RSU 107, such as based on V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), and/or a combination thereof and/or with other devices, which can be collectively referred to as vehicle-to-anything (V2X) communications. V2X communication may comprise, e.g., eV2X communication, cellular V2X (cV2X) communication, etc. Referring again to FIG. 1, in certain aspects, a UE 104, e.g., a transmitting Vehicle User Equipment (VUE) or other UE, may be configured to transmit messages directly to another UE 104. The communication may be based on V2V/V2X/V2I or other D2D communication, such as Proximity Services (ProSe), etc. Communication based on V2V, V2X, V2I, and/or D2D may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples in connection with V2X/V2V/D2D communication, the concepts described herein may be applicable to other similar areas, such as 5G NR, LTE, LTE-A, CDMA, GSM, and other wireless technologies.

Referring again to FIG. 1, in certain aspects, a transmitting device may comprise a zone ID component 198 configured to determine a zone ID for the transmitting device or for a message and to transmit a message including the zone ID for receipt by at least one receiving device, e.g., UE 104'. The transmitting device, e.g., UE 104, may comprise a vehicle, a device associated with a vehicle, a RSU, a UE, or other device communicating based on based on V2X (e.g., eV2X), V2V, D2D, etc. communication. In certain aspects, a relay device, e.g., UE 104", may comprise a zone ID relay component 191 configured to determine whether to relay the message based at least on the first zone ID. If the relay device determines to relay the message, the relay device may transmit a relayed message that includes information reflecting the first zone ID. The relay device may comprise a vehicle, a device associated with a vehicle, a RSU, a UE, or other device communicating based on based on V2X (e.g., eV2X), V2V, D2D, etc. communication. While FIG. 1 illustrates relay as a vehicle (e.g., UE 104"), in other examples the relay may comprise a stationary device such as an RSU or a base station. In certain aspects, a receiving device may comprise a zone ID reception component 199 configured to identify a first zone ID for a transmitting device for a received message and to determine whether to decode data of the message based at least on the first zone ID for the transmitting device. The receiving device may decode or refrain from decoding the data of the message according to the determining based on the first zone ID. The receiving device, e.g., UE 104', may comprise a vehicle, a device comprised in a vehicle, etc. The receiving device may comprise a vehicle, a device associated with a vehicle, a RSU, a UE, or other device communicating based on based on V2X (e.g., eV2X), V2V, D2D, etc. communication.

Figure 2:
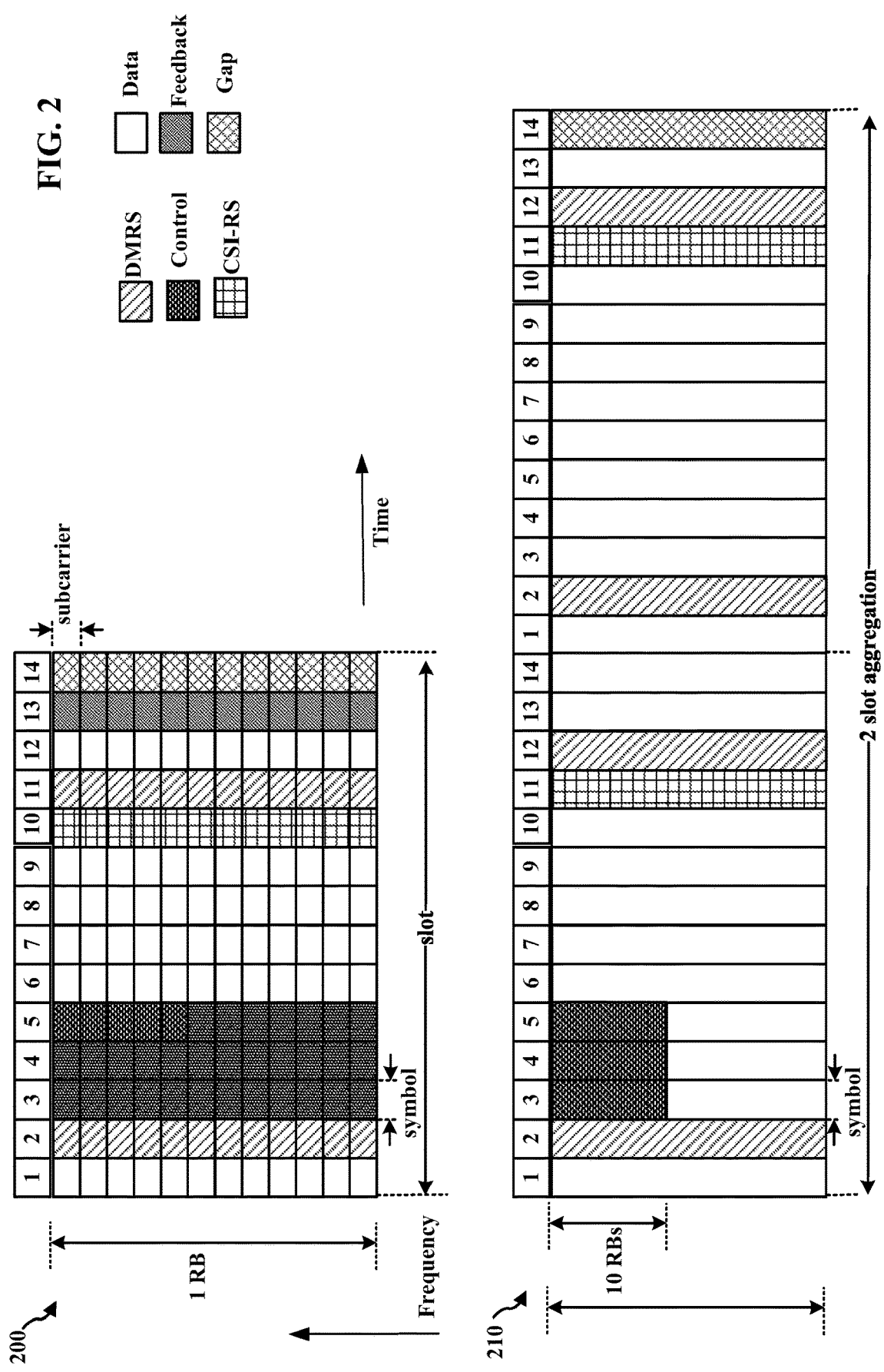
FIG. 2 illustrates example aspects of a sidelink slot structure.

FIG. 2 illustrates example diagrams 200 and 210 illustrating examples slot structures that may be used for wireless communication between devices, such as UEs 104, 104' 104", e.g., for sidelink communication. The slot structure may be within a 5G/NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single slot transmission, e.g., which may correspond to a 0.5 ms transmission time interval (TTI). Diagram 210 illustrates an example two-slot aggregation, e.g., an aggregation of two 0.5 ms TTIs. Diagram 200 illustrates a single RB, whereas diagram 210 illustrates N RBs. In diagram 210, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information, e.g., along with demodulation RS (DMRS). FIG. 2 also illustrates that symbol(s) may comprise CSI-RS. The symbols in FIG. 2 that are indicated for DMRS or CSI-RS indicate that the symbol comprises DMRS or CSI-RS REs. Such symbols may also comprise REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 2, or 4 symbols depending on a configured number of ports. CSI-RS can be periodic, semi-persistent, or aperiodic (e.g., based on DCI triggering). For time/frequency tracking, CSI-RS may be either periodic or aperiodic. CSI-RS may be transmitted in busts of two or four symbols that are spread across one or two slots. The control information may comprise Sidelink Control Information (SCI). At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 2. Multiple slots may be aggregated together. FIG. 2 also illustrates an example aggregation of two slot. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example.

Figure 3:
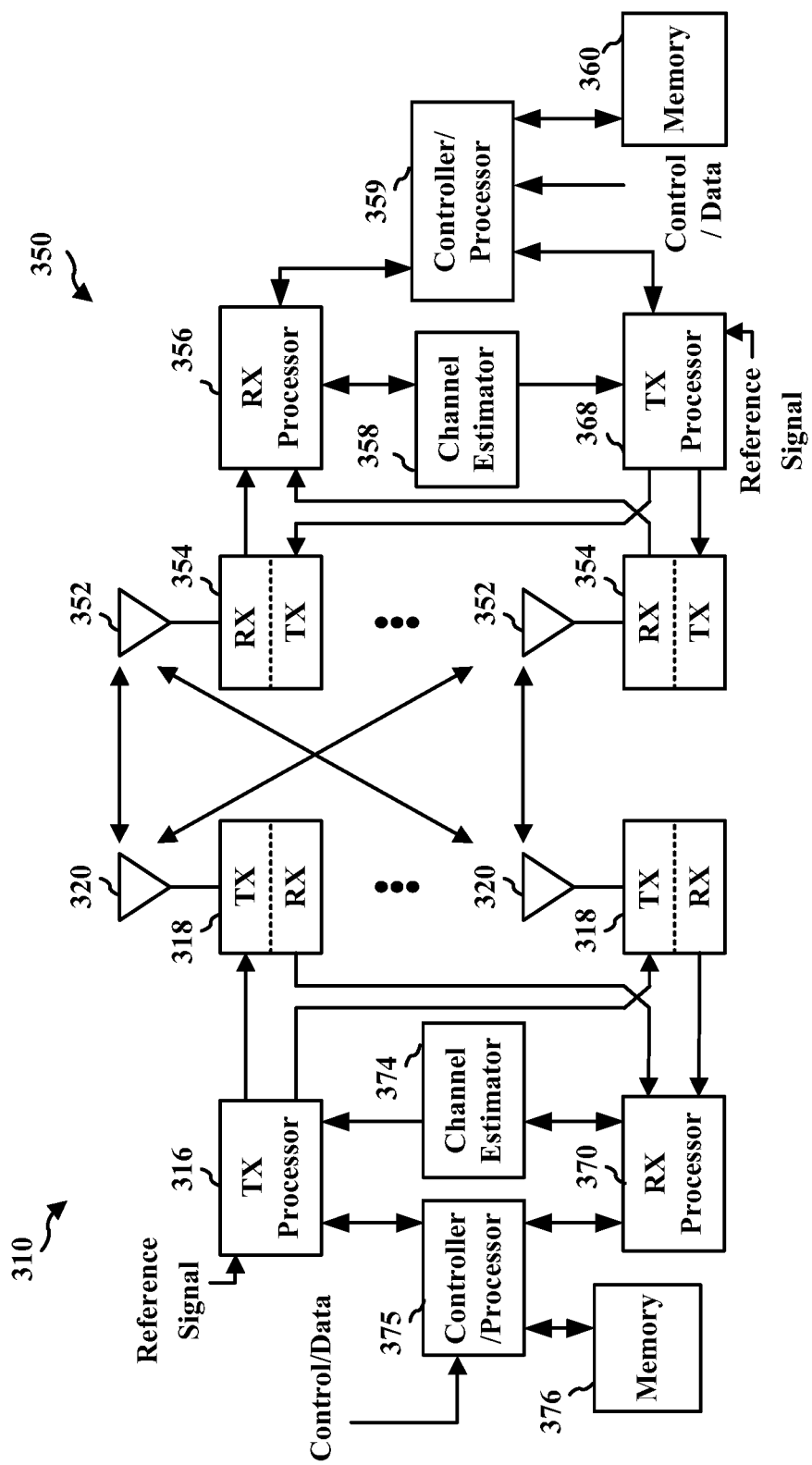
FIG. 3 is a diagram illustrating an example of a base station and UE in an access network.

FIG. 3 is a block diagram 300 of a first wireless communication device 310 in communication with a second wireless communication device 350, e.g., via V2V/V2X/D2D communication. The device 310 may comprise a transmitting device communicating with a receiving device, e.g., device 350, via V2V/V2X/D2D communication. The communication may be based, e.g., on sidelink. The transmitting device 310 may comprise a UE, an RSU, etc. The receiving device may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of device 350 or the TX 316, the RX processor 370, or the controller/processor 375 may be configured to perform aspects described in connection with 191, 198, and/or 199 of FIG. 1.

Various features and aspects presented herein relate to relay communication between devices, e.g., UE-to-UE relay communication. The relay communication may be based on V2X (e.g., including eV2X, cV2X, etc.), V2V, or D2D communication. In Proximity Based Services (ProSe), the relay of UE-to-UE messages may occur at an application layer. Thus, the packets of data of messages may be processed by Application layers of relay devices in order for the relay device to determine whether to forward the message. Once the relay device determines to forward the message, the data packets of the message may be re-encapsulated, e.g., with headers for the forwarded message. The processing time required for a relay device to process a message in this manner may be too slow for some applications. As one example, the processing may be too slow for eV2X, V2V, V2X communication, or other D2D communication where it may be desired for the end to end delay of the packets of data to be short, e.g. a few ms, such as 20 ms or less. For example, the message may include data (e.g., a packet of data) that requires high reliability and/or low latency. The message may include mission critical driving data. For example, the message may include data (e.g., a packet of data) regarding sensor data, road conditions, traffic conditions, driving commands, caravan communications, or the like. The message may include V2X messages that require an extended ranged, for example, based on associated QoS parameters. As an example, the message may include a basic safety message or other message from more advanced V2X applications. A format of the message may depend on the application and/or a region in which the device is used. For example, the format of the message may be of the WAVE Short Message Protocol (WSMP) as defined by IEEE1609.3, the GeoNetworking message format defined by European Telecommunications Standards Institute-Intelligent Transport Systems (ET SI-ITS), etc.

Aspects presented herein provide a way to relay messages at a lower layer relay mechanism. For a V2X example, the relay message may be processed by a V2X layer to determine whether to relay the message. By relaying the messages at a lower layer than the application layer, the processing time may be reduced. Therefore, the messages may be relayed to other receiving vehicles in a much quicker manner. However, the relay of messages at a lower layer has added challenges. The relay of messages at a lower layer may lead to receiving devices being flooded with multiple messages based on a single message from a transmitting vehicle. Such flooding wastes radio resources and would place a burden on the receiving device's processing abilities. The processing burden may occur because some information regarding the message may not be available at the lower layer. Thus, a receiving device may receive an unnecessary amount of messages and may attempt to process each of the messages.

Figure 4:
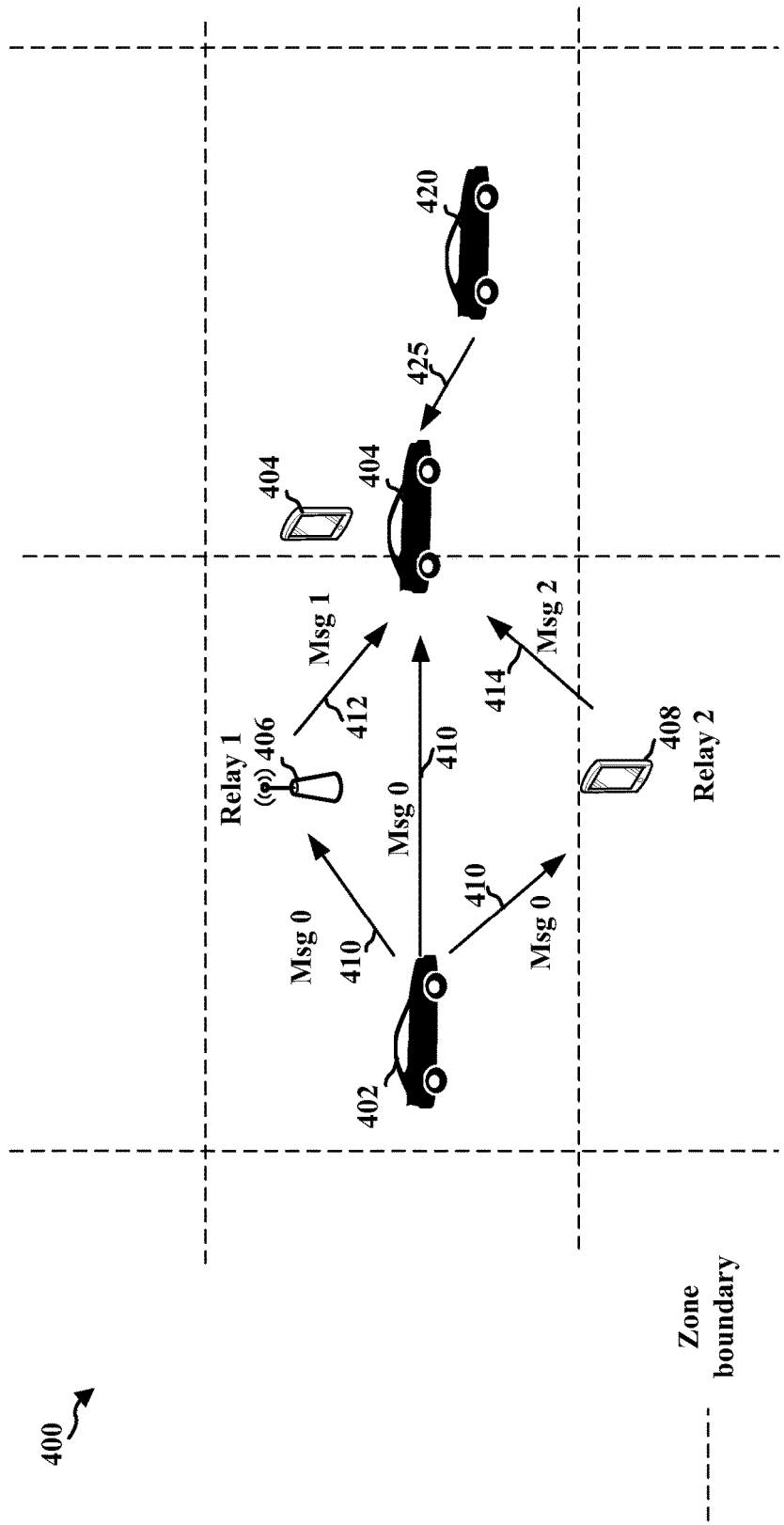
FIG. 4 is a diagram illustrating relay control management in a wireless communication system.

FIG. 4 illustrates an example 400 of the relay of messages between devices, (e.g., transmitting devices 402, 420, receiving device 404, and relay devices 406, 408). The messages may be communicated using e.g., eV2X, V2X, V2V, and/or D2D communication. The transmitting device 402 may be a transmitting UE, the receiving device 404 may be a receiving UE, and the relay devices 406 and 408 may be stationary devices or mobile devices, such as a base station, a relay UE, a vehicle, a road side unit, etc. The relay devices may include mobile or stationary stations. In one example, the relay devices may include road side units. Any UE or station, whether mobile, stationary, can operate as the transmitting device, the receiving device, or the relay device according to the aspects herein. Any of the vehicles or stations may operate as a transmitter, receiver, and/or relay for messages. The transmitting device 402 may transmit a message 410, which may be referred to as Msg 0. As illustrated in FIG. 4, the receiving device 404 may receive Msg 0 410 directly from transmitting device 402. FIG. 4 illustrates an example of a receiving device 404 associated with a vehicle and another example receiving device 404 as a UE that is not associated with a vehicle. Aspects can be applied to any receiving device receiving communication based on D2D communication, V2X communication, etc. Msg 0 410 may also be received by relay devices 406, 408, and the relay devices 406, 408 may determine to relay Msg 0. Relay device 406 transmits relayed message Msg 1 412 based on Msg 0 410. Relay device 408 transmits relayed message Msg 2 412 based on Msg 0 410. The receiving device 404 may receive all three messages, e.g., Msg 0, Msg 1, and Msg 2.

If a packet of data of message, e.g., Msg 0 410, is processed by lower layers (e.g., lower than an application layer) of the relay devices (e.g., 406, 408), the receiving device may process an undesirable amount of replicated messages, e.g., such as multiple relayed messages 412, 414, as well as the original messages 410. Not only does the replication of the original messages waste radio resources, but the receiving device 404 may also attempt to process each of the messages. The added processing places a burden on the processing ability of the receiving device and uses additional battery power. As an example, the processing of multiple replications, e.g., Msg 0, Msg 1, and Msg 2, may use the receiving device's processing capabilities at a level that causes the receiving device to drop other messages. For example, the receiving device may be unable to receive a new message 425 from a different transmitting device 420 because the receiving device is unnecessarily processing three messages that all correspond to Msg 0. Thus, the repeated message may cause lower reliability and less coverage for the receiving UEs. Aspects presented herein help to reduce unnecessary message handling at the receiving UEs.

Aspects presented herein provide mechanisms for controlling the relay of messages in a way that helps to avoid the over replication of messages. As one example, the transmitting device may indicate whether the message 410 should be relayed or not. For example, the relay device (e.g., 406, 408) may decide that the message 410 to be relayed by an indication, e.g., by 5G quality of service (QoS) indicator (5QI)/QoS Class Identifier (QCI) placed in a message header (e.g. in a service data adaptation protocol (SDAP) header), or some flags in physical layer/media access control (PHY/MAC) message header. The transmitting device transmit a QoS indicator or some other flag for relay of a message that indicates to a relay whether the message should be relayed. The QoS or flag may be based on an intended range for the message. As another example the relay devices 406, 408 may determine whether to relay the message using a hop count in a message header. For example, the original transmitter may have set the hop count to 1 in a message header in Msg 0. The relay device will decrement the hop count by 1 (to 0) when relaying the message, e.g. as Msg 1 and Msg 2. If Msg 1 and Msg 2 were received by another relay device, they would not be relayed further since the hop count is 0.

As another example, a transmitting device's geographical zoning information may be mapped to an identifier that can be used in processing messages at a lower layer. For example, the geographical zoning information may be mapped to a layer 2 identifier (L2 ID) of the transmitting UE in order to allow the control of message relay as well as the receipt of messages. For example, the zoning information can be used as the first or last 8 bits of the L2 ID. Relay devices can use the geographical zoning information to decide whether to relay the message. Receiving devices can use the zoning information or other location information regarding their own location (the receiving devices' location) and the location of a transmitting device to determine whether to receive/process the message. The use of a geographical zoning information can advantageously improve reliability and reduce message processing for V2X, V2V, or eV2X communication.

Figure 5:
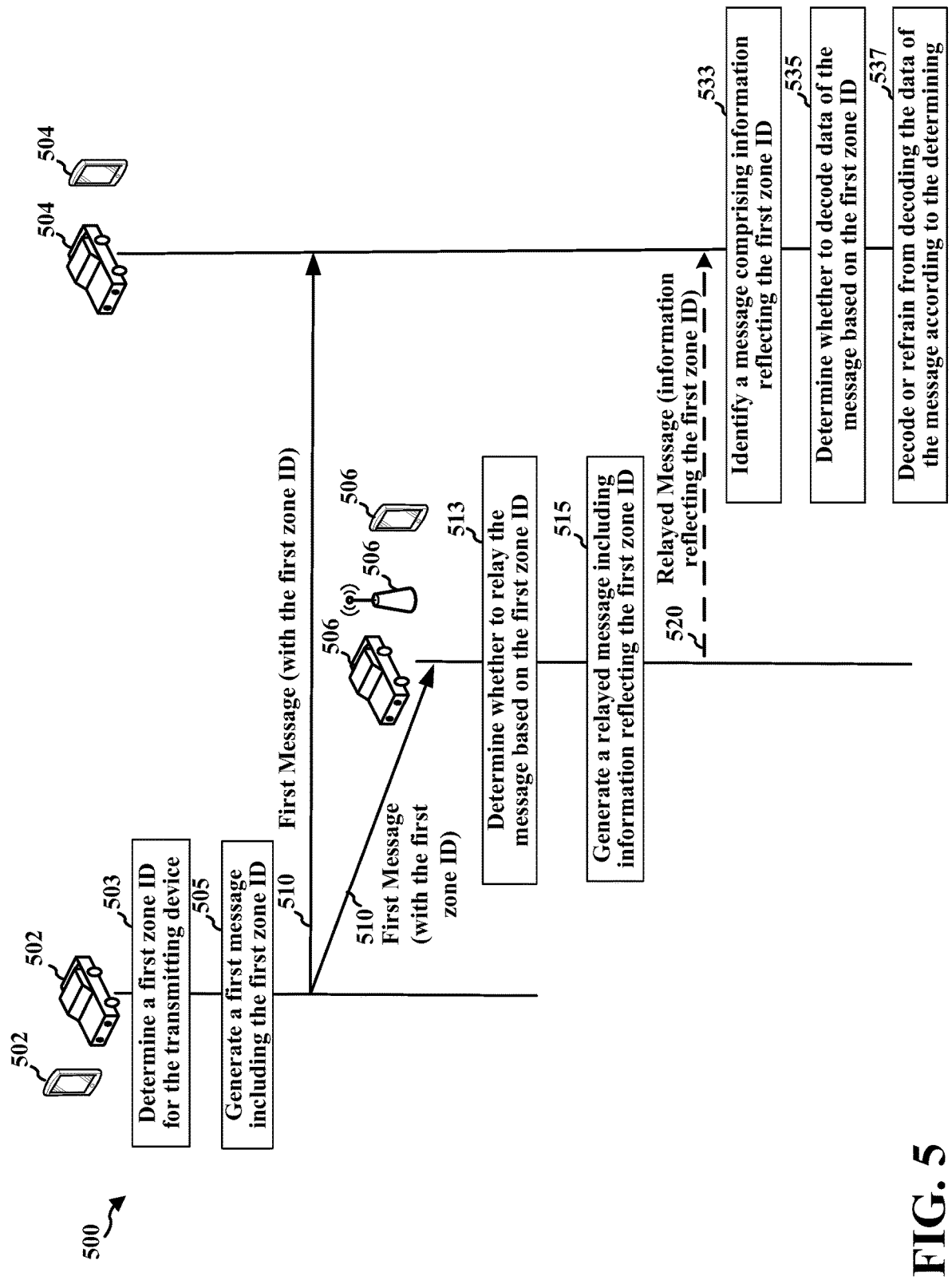
FIG. 5 is a diagram illustrating message relay in a wireless communication system.

FIG. 5 is a diagram illustrating additional aspects that help to reduce wasted resources and/or processing burdens for relayed messages using processing at a lower layer. The transmitting device 502 may be a transmitting UE, the receiving device 504 may be a receiving UE, and the device 506 may be a relay UE. Each of devices 502, 504, 506 may be capable of transmitting and receiving eV2X, V2V, V2V, and/or D2D communication. Thus, at another time, device 504 may be a transmitting device and device 502 may be a receiving device.

Message handling at a relay device or receiving device may be reduced by including geographic location information or the geographical zoning information of the transmitting device 502 in the message. The relaying devices may use the zoning information to decide whether to relay the message and/or whether to process the message. The determination may be based, e.g., on a distance of the receiving device/relay device from the transmitter's location. At 503, the transmitting device 502, for example, the transmitting device 502, e.g., transmitting UE, may be configured to determine a first zone ID for the transmitting device. The transmitting device may first determine a geographical location of the transmitting device, e.g., using a Global Positioning System (GPS), etc. After determining a geographical location, the transmitting device may determine a corresponding zone ID for message. As an alternate, a satellite position, network position, or other position may be converted to a zone ID. FIG. 4 illustrates an example of zones having zone boundaries. The zone ID may be mapped to a L2 ID of the transmitting device 502 and may be signaled by the transmitting device in connection with the data message. The zone ID may also be explicitly signaled with the data message, e.g. as part of a message headers. For example, each transmitting device 502 may determine a geographical zone at the time that it is preparing to transmit a first message 510. Zones for such communication may be predetermined or may vary. The zone separation and/or size may be either pre-configured on the transmitting device 502. Zone sizes may be different for different regions and may also be dynamically provisioned or signaled to the UEs. Thus, zone sizes and/or locations for the communication may be broadcast to the transmitting device 502, e.g., by a base station (e.g., eNB/gNB) or other nearby device. The relay 506 may also use the geographical zoning information to decide on the action of relaying. The zoned L2 IDs may be used by the receiving device 504 to filter out some relayed messages.

In some aspects, the transmitting device 502 may determine the first zone ID by determining the geographical location of the transmitting device 502 and converting the geographical location into the first zone ID. For example, the geographical location may be converted into the zone first ID based on a preconfigured relationship. For example, all geographic locations within a certain area (e.g., within an area bounded by a zone boundary illustrated in FIG. 4) may be mapped to the same zone ID. As another example, the geographical location may be converted into the zone ID based on information received from a base station (not shown). As yet another example, the geographical location may be converted into the zone ID based on information received from the relay 506. As such, the first zone ID may indicate a location of the transmitting device 502.

At 505, the transmitting device 502 may generate a first message and a first zone ID.

The first message may comprise a data payload for transmission. The first zone ID may be transmitted along with the first message, whether in a single message or in a separate message. For example, in the first message, which may be referred to as an "original message," the transmitting device 502 may include an indication of the first zone ID. A first source L2 ID may be a L2 ID of the transmitting UE, and a first destination L2 ID which may be, e.g., a L2 ID for the broadcast group. The L2 ID may be further based on the zone ID that corresponds to the geographical location of the transmitting device. For example, the first zone ID can be embedded either in a MAC header of the first message, or as part of a SDAP header on a top of a PDCP header of the first message.

Thus, in some aspects, the first zone ID may be included in the MAC header of the first message. The transmitting device 502 may include the first zone ID in the MAC header of the first message. In some other aspects, the first zone ID may be included in the SDAP header of the first message. The transmitting device 502 may include the first zone ID in the SDAP header of the first message. In some aspects, in addition to the first zone ID, the first message further comprises the L2 ID further based on at least one of the source ID and the destination ID. In some aspects, the first message may further comprise an indicator that indicates whether the first message should be relayed. The first message may further comprise a designation of a relay that is intended to forward the first message. For example, a unicast message may have a corresponding indication of at least one relay that should relay the message to the receiving device. Such an indication enables the transmitting device to avoid over replication of the message by unintended relays. The transmitting device 502 (e.g. 402) may include an indicator that indicates whether the first message should be relayed in the first message or may transmit the indication in a separate message.

At 510, the transmitting device 502 may transmit the first message with a corresponding indication of the first zone ID. The relay 506 may receive the first message comprising the indication of the first zone ID from the transmitting device 502. The relay 506 may receive and decode or otherwise process the first message using a lower layer, e.g., a lower layer than an application layer. The relay device may receive some control information corresponding to the first message. The control information may indicate that the first message is an original transmission as opposed to a relayed message.

At 513, the relay 506 may determine whether to relay the first message based at least on the first zone ID. The determination may be performed at the lower layer at which the message is received and processed. Using the first zone ID information in the MAC or SDAP header of the first message, the relay 506 may decide on the actions, e.g. whether to process the message and/or whether to relay the message. If the relay 506 decides to relay the message, the relay may map the first zone ID to a new destination ID. The new destination ID may be placed into control information for a relayed message when sending the relayed message. The control information for the relayed message may indicate that the message is a relayed message of the first message. For example, the relay 506 may use the zoning information reflecting the first zone ID to decide whether to relay the first message. In some aspects, the relay 506 may determine to relay the first message when the relay 506 is located in a different zone than a zone corresponding to the first zone ID in the first message. In some aspects, the relay 506 may determine not to relay the first message when the relay 506 is located in a same zone as a zone corresponding to the first zone ID in the first message. In some aspects, the relay may determine to relay the first message based on proximity of a zone of the relay and the zone corresponding to the zone ID. The relay may determine not to relay messages that are received from nearby zones, as well. Thus, the relay may determine a set of zone IDs for which the relay will not relay messages. When a message is received having a corresponding zone ID that is outside of the set of zone IDs, the relay device may determine to relay the message. The relay may further base the determination on an indication as to whether the message should be relayed and/or an indication of particular relay(s) that are intended to relay the message.

At 515, if the relay 506 determines to relay the first message, the relay 506 may generate a relayed message, where the relayed message includes information reflecting the first zone ID. For example, the information may reflect or otherwise indicate the first zone ID by including the first zone ID, by using resources corresponding to the first zone ID, by scrambling the information with the first zone ID, by generating a different identifier based on the first zone ID, by generating a different identifier that is a function of the first zone ID, or the like, such that the first zone ID may be determined by another device based on the information. In some aspects, the generating the relayed messaged may further involve including information reflecting a second zone ID of the relay 506 in the relayed message. For example, the information may reflect the second zone ID by including the second zone ID, by using resources corresponding to the second zone ID, by scrambling the information with the second zone ID, by generating a different identifier based on the second zone ID, by generating a different identifier that is a function of the second zone ID, or the like, such that the second zone ID may be determined by another device based on the information. In some aspects, the generating the relayed messaged further comprises including information reflecting a relay ID in the relayed message. For example, the information may reflect the relay ID by including the relay ID, by using resources corresponding to the relay ID, by scrambling the information with the relay ID, by generating a different identifier based on the relay ID, by generating a different identifier that is a function of the relay ID, or the like, such that the relay ID may be determined by another device based on the information. The relay 506 may generate the relayed message including information reflecting the second zone ID of the relay 506, and/or the relay ID. In some aspects, generating the relayed message at 515 may further comprise including a second destination ID in the relayed message, where the second destination ID may include information reflecting the first zone ID, the second zone ID for the relay and the relay ID.

When the relay 506 receives the first message, the relay 506 may form a relayed message. For example, the relayed message may include a second source L2 ID and the second destination ID. The second source L2 ID may be the L2 ID of the relay 506. In another example, the second source L2 ID may be the source L2 ID in the received first message. The relay 506 may map the second destination L2 ID according to the zoning information in the first message, for example, the first zone ID. The first zone ID may be carried in the first message in the MAC header or SDAP header, which is for the relay 506 to convert the first zone ID to the second destination L2 ID. The second destination L2 ID may include information reflecting the first zone ID. For example, the relay 506 may include such information in the PHY layer control information regarding transmission of data of the relayed message. For example, the first zone ID may be mapped to the second destination L2 ID, which may be included/reflected in the control information for the relayed message. For example, there may be another flag indicating this is a relayed message.

The second destination ID may further include information reflecting the second zone ID of the relay 506, and/or a relay ID. For example, the second destination ID may be a function of the first zone ID, the second zone ID for the relay and the relay ID. The relay 506 may map the second destination L2 ID according to the zoning information in the first message.

In some aspects, the information reflecting the first zone ID may be included in control information for the relayed message. In some aspects, the information reflecting the first zone ID may be indicated in a scheduling assignment (SA) for the relayed message. In some aspects, the information reflecting the first zone ID may be indicated in a MAC header of the relayed message. For example, the second destination L2 ID may be reflected in the control information, for example, in the scheduling assignment (SA), when sending out the relayed message. For example, the first zone ID may be reflected in the SA as part of the second destination ID in the MAC (or SDAP) header. The SA may be sent in different channel and radio frames than the data of the relayed message.

In some aspects, the relay 506 may select a radio resource group for sending the relayed message based on the second destination ID that reflects the first zone ID comprised in the message. The radio resource group may comprise a set of wireless resources in time and frequency. The relay 506 may use a different radio resources group for messages from different zones. The control information, for example, the SA, may be sent in different channel and radio frames than the data of the relayed message. For example, the SA may be sent in a physical sidelink control channel (PSCCH), while the data of the relayed message may be sent in a physical sidelink shared channel (PSSCH).

At 520, the relay 506 may transmit the relayed message including information reflecting the first zone ID. The relay 506 may transmit the relayed message in response to the determining to relay the first message. In some aspects, the information reflecting the first zone ID is included in control information for the relayed message, where the transmitting the relayed message comprises transmitting the control information in the PSCCH, and transmitting data of the relayed message in the PSSCH.

At 533, the receiving device 504 may identify a message comprising information reflecting the first zone ID for the transmitting device. The message may be the first message (the original message) 510 or the relayed message 520 from the relay. As the receiving device receives both messages, the receiving device may perform the identification and determination at 533, 535 for each message. The receiving device 504 may be able to filter at a lower layer, e.g. PHY layer/MAC control, for relay messages from a zone ID that the receiving device 504 may want to exclude. The filtering for the zone ID can be done at the lower layer based on the control information for the message. The zone ID may be indicated in a destination L2 ID. For example, the control information may be received in a control channel, e.g., PSCCH. The destination L2 ID may be reflected in the control information of the PHY/MAC, which may be used by the receiving device 504 to filter messages without processing the actual data packet of the message.

The receiving device 504 may handle the message and perform decision based on the control information for the message. For example, the receiving device 504 may decide whether to decode the corresponding data block of the message based on the control information for the message such as SA for the message. At the time of receiving the SA, the receiving device 504 has not decoded anything of the header of the message yet. In this way, the processing time can be reduced and the processing resources can be saved, which prevent the receiving UE to drop other messages. Therefore, the liability and the coverage of the communication can be advantageously increased.

At 535, the receiving device 504 may determine whether to decode data of the message based at least on the first zone ID for the transmitting device. Thus, the receiving device may determine a zone ID of the transmitting device, e.g., based on control information that may indicate the destination L2 ID for the message. The receiving device 504 may determine whether to decode data of the message based the destination L2 ID, which may include information reflecting the first zone ID. For example, the receiving device may determine not to decode or otherwise process a relayed message, e.g., filtering out the message, if the transmitting device 502 of the original message is in the same zone as the receiving device 504. This may reduce unnecessary processing by the receiving device, because the receiving is likely to receive the original message directly from the transmitting device in the same zone and processing the relayed message would unnecessarily duplicate processing at the receiving device. In another example, the receiving device may determine a set of nearby zone IDs for which the receiving device will not decode relayed messages.

The receiving device 504 may first determine whether the message is a relayed message. A flag for the message may indicate whether the message is a relayed message or a message directly from the original transmitting device. The receiving device may then determine the zone ID of the transmitting device and may determine whether the zone ID of the transmitting device is in the same zone as the receiving device 504, or a set of excluded zone IDs, before proceeding to receive/process/decode the data block of the relayed message. This filtering determination may be achieved by including such zone ID information in the PHY layer/MAC layer control information regarding the transmission of the relayed message. With this formation, the receiving device 504 may avoid unnecessary processing even if the receiving device receives duplicated messages.

In some aspects, in order to determine whether the transmitting device and the receiving device have the same zone ID, the receiving device 504 may further determine a receiving zone ID for the receiving UE. The receiving UE may determine its geographical location and a corresponding zone ID based on the geographical location. The receiving device 504, e.g., receiving UE, may determine to refrain from decoding the data of the message when the message comprises a relayed message and the first zone ID is the same as the receiving zone ID or a set of excluded zone IDs near the receiving zone ID. On the other hand, the receiving device 504 may determine to decode the data of the message when the message comprises a relayed message and the first zone ID is different than the receiving zone ID. In some aspects, the step of identifying the message comprises receiving control information for the message, where the control information includes the information reflecting the first zone ID.

As an example, the receiving device 504 may be configured to decode data of a message when a destination ID is a broadcast group ID, or a destination ID is from a relay in a different zone from the receiving device 504. Further, the receiving device 504 may decide whether to receive from a specific relay using the relay's ID or the relay's zone ID. In this way, the receiving device 504 may avoid receiving a relayed message from a relay in the same zone as the receiving device 504.

In some aspects, the receiving device 504 may determine whether to decode data of the message further based on the second zone ID for the relay and whether the message comprises a relayed message from the relay. For example, the receiving device 504 may determine whether to decode data of the message further based on whether the second zone ID is the same as the first zone ID, or the receiving device's own zone ID. In some aspects, the receiving device 504 may determine whether to decode data of the message further based on the relay ID of the relay 506 and whether the message comprises a relayed message from the relay 506.

At 537, the receiving device 504 may decode or refrain from decoding the data of the message according to the determining based on the first zone ID.

Figure 6:
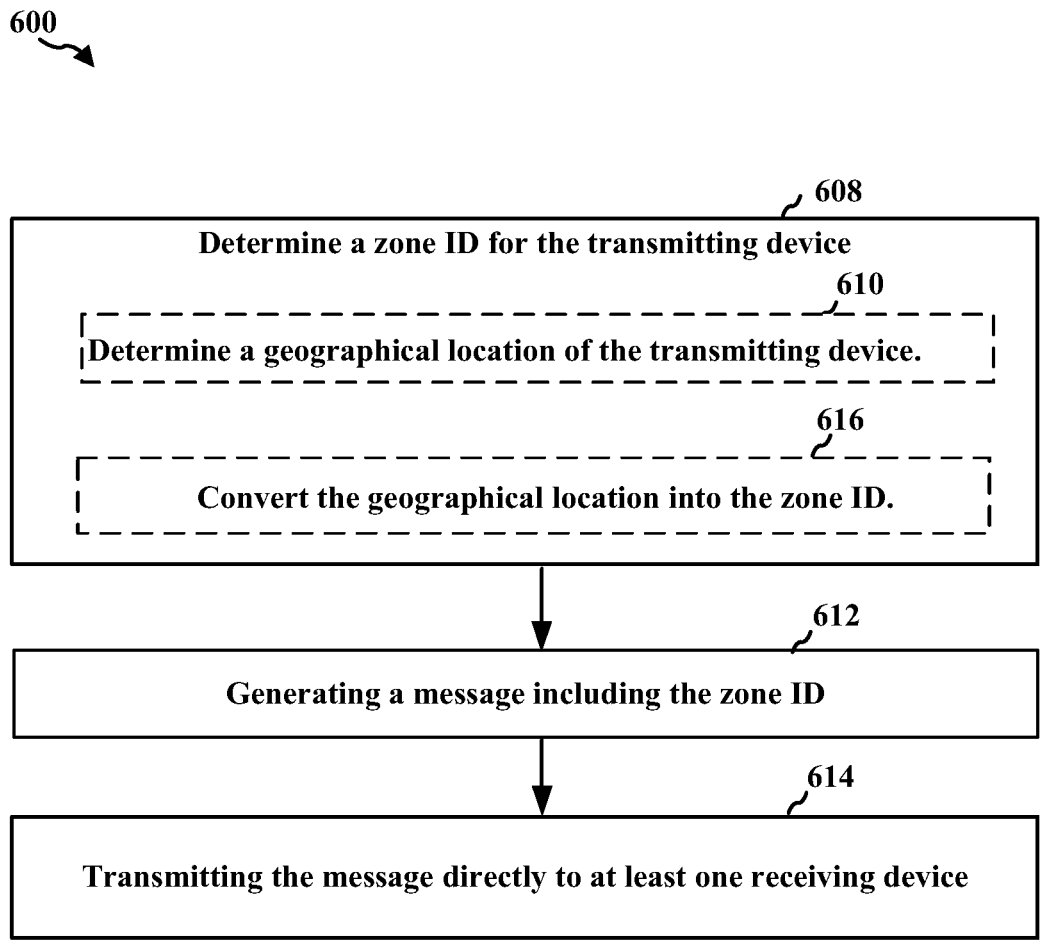
FIG. 6 is a flowchart of a method of wireless communication.

FIG. 6 is a flowchart 600 of a method of wireless communication at a transmitting device. The method may be performed, for example, by a transmitting UE or a component of a transmitting UE (e.g., UE 104; transmitting device 402, 502, 1050; the apparatus 702/702'; processing system 814, which may include memory 360/376 and which may be an entire UE or a component of a UE, such as TX processor 368/316, RX processor 356/370, and/or the controller processor 359/375) communicating with a relay (e.g., UE 104"; relay device 406, 408, 506, etc.) and a receiving UE (e.g., UE 104; receiving device 404, 504, etc.) in a wireless communication. The method may improve the efficient use of wireless resources by reducing the over replication of relay messages as well as improving the efficient use of processing abilities at a receiving device, while providing for lower layer processing of messages. The wireless communication may comprise any of eV2X, V2X, V2V, or D2D communication. The transmitting UE may comprise a vehicle or a device comprised in a vehicle. To facilitate an understanding of the techniques and concepts described herein, the method of flowchart 600 may be discussed with reference to the examples illustrated in FIGS. 4 and 5. Optional aspects may be illustrated in dashed lines.

At 608, the transmitting device may determine a first zone ID for the transmitting UE.

The determination may be performed, e.g., by zone ID component 708 of apparatus 702. Geographical zoning information for the transmitting device may be mapped to a layer 2 identifier (L2 ID) of the transmitting device in order to allow the control of receiving messages as well as the traffic separation. In some aspects, the determining the first zone ID for the transmitting device may comprise determining the geographical location of the transmitting device, as illustrated at 610, and converting the geographical location into the first zone ID, as illustrated at 616. For example, the geographical location may be converted into the first zone ID based on a preconfigured relationship. As another example, the geographical location may be converted into the zone ID based on information received from a base station (not shown). As yet another example, the geographical location may be converted into the zone ID based on information received from the relay.

At 612, the transmitting device may generate a message including the first zone ID. The message may be generated, e.g., by message component 712 of apparatus 702. For example, in the message, the transmitting device may include the first zone ID, a first source L2 ID which may be a L2 ID of the transmitting device, and a first destination L2 ID which may be a broadcast group L2 ID. By providing an indication of the zone ID of the transmitting device in connection with a message, relay devices can avoid relaying messages for transmitting devices that are likely to achieve a similar level of coverage. This can avoid the over replication of messages. As well, the indication of the zone ID may help the receiving device to filter relayed messages in order to avoid decoding relayed messages that are based on messages that the receiving device also receives directly from the transmitting device.

In some aspects, the first zone ID may be included in the MAC header of the message. The transmitting device may include the first zone ID in the MAC header of the message. In some other aspects, the first zone ID may be included in the SDAP header of the message. The transmitting device may include the first zone ID in the SDAP header of the message. The first zone ID may be included in control information of the message. In some aspects, in addition to the first zone ID, the message further comprises the L2 ID based on at least one of the source ID and the destination ID. The source ID may comprise a L2 ID of the transmitting device, and the destination ID may comprise a broadcast group ID. The transmitting device may include the L2 ID based on at least one of the source ID and the destination ID in the message. In some aspects, the message may further comprise an indicator that indicates whether the first message should be relayed. The message may further comprise a designation of a relay that is intended to forward the message. The designation of whether the message is a relay message along with the zone ID information from the transmitting device enable the receiving device to filter the messages for more efficient use of its processing capabilities. The transmitting device may include an indicator that indicates whether the message should be relayed in the message.

At 614, the transmitting device may transmit the message that include the first zone ID. The message may be transmitted, e.g., by transmission component 706 of apparatus 702. The message may be transmitted to be received directly other UEs, e.g., UE(s) 750.

Figure 7:
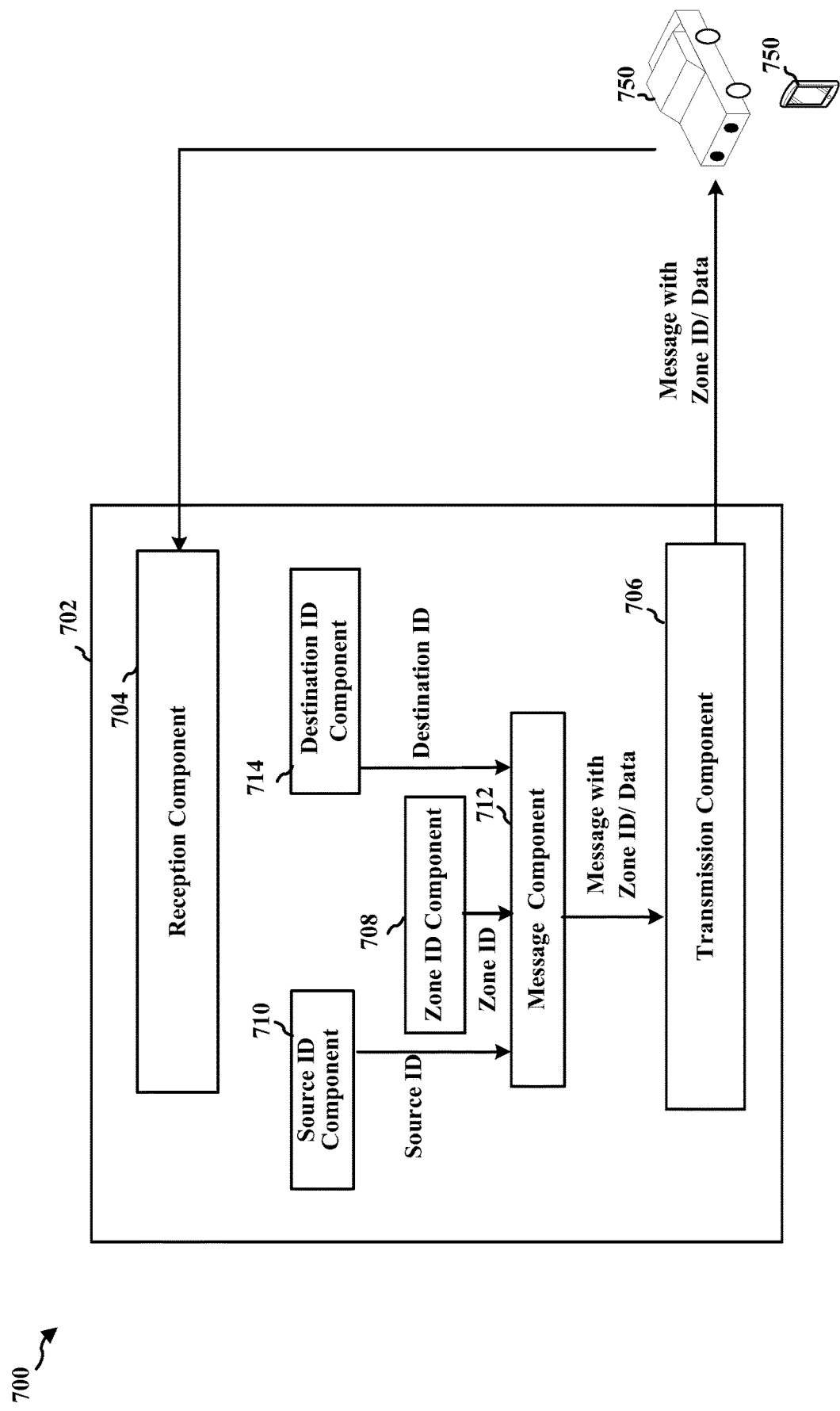
FIG. 7 is a conceptual data flow diagram illustrating the data flow between different means/components in an example apparatus.

FIG. 7 is a conceptual data flow diagram 700 illustrating the data flow between different means/components in an example apparatus 702. The method may be performed, for example, by a transmitting device (e.g., UE 104; transmitting device 402, 502, 1050; the apparatus 702/702', etc.) communicating with a relay device (e.g., UE 104", 406, 408, 506, 750, the apparatus 1002/1002', etc.) and/or a receiving device (e.g., UE 104; receiving device 404, 504, 750; the apparatus 1302/1302', etc.) in a wireless communication. The transmitting device may comprise, e.g., a component of a UE or an entire UE. The wireless communication may comprise a eV2X, V2X V2V, or D2D communication, as described herein.

The apparatus includes a zone ID component 708 that determines the zone ID for the apparatus, e.g., as described in connection with 503, 608. The apparatus may also include a source ID component 710 that determines a source ID, and a destination ID component 714 that determines a destination ID for communication. In some aspects, the zone ID component 708 may determine the geographical location of the apparatus and converting the geographical location into the zone ID.

The apparatus includes a message component 712 that generates a message including the zone ID, e.g., as described in connection with 505, 612. In some aspects, the first zone ID may be included in the MAC header of the message. The transmitting UE may include the first zone ID in the MAC header of the message. In some other aspects, the first zone ID may be included in the SDAP header of the message. The transmitting UE may include the first zone ID in the SDAP header of the message. The first zone ID may be included in control information of the message. In some aspects, in addition to the first zone ID, the message further comprises the L2 ID based on at least one of the source ID and the destination ID. The source ID may comprise a L2 ID of the transmitting UE, and the destination ID may comprise a broadcast group ID. The transmitting UE may include the L2 ID based on at least one of the source ID and the destination ID in the message. In some aspects, the message may further comprise an indicator that indicates whether the first message should be relayed. The message may further comprise a designation of a relay that is intended to forward the message. The transmitting UE may include an indicator that indicates whether the message should be relayed in the message.

The apparatus includes a transmission component 706 for transmitting the message including the zone ID to the receiving/relay UEs, e.g., as described in connection with 510, 614. The apparatus further includes a reception component 704 that receives feedback from receiving UEs regarding reception of the message(s).

The apparatus may include additional components that perform each of the blocks of the algorithm in the aforementioned flowcharts of FIGS. 5-6. As such, each block in the aforementioned flowcharts of FIGS. 5-6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
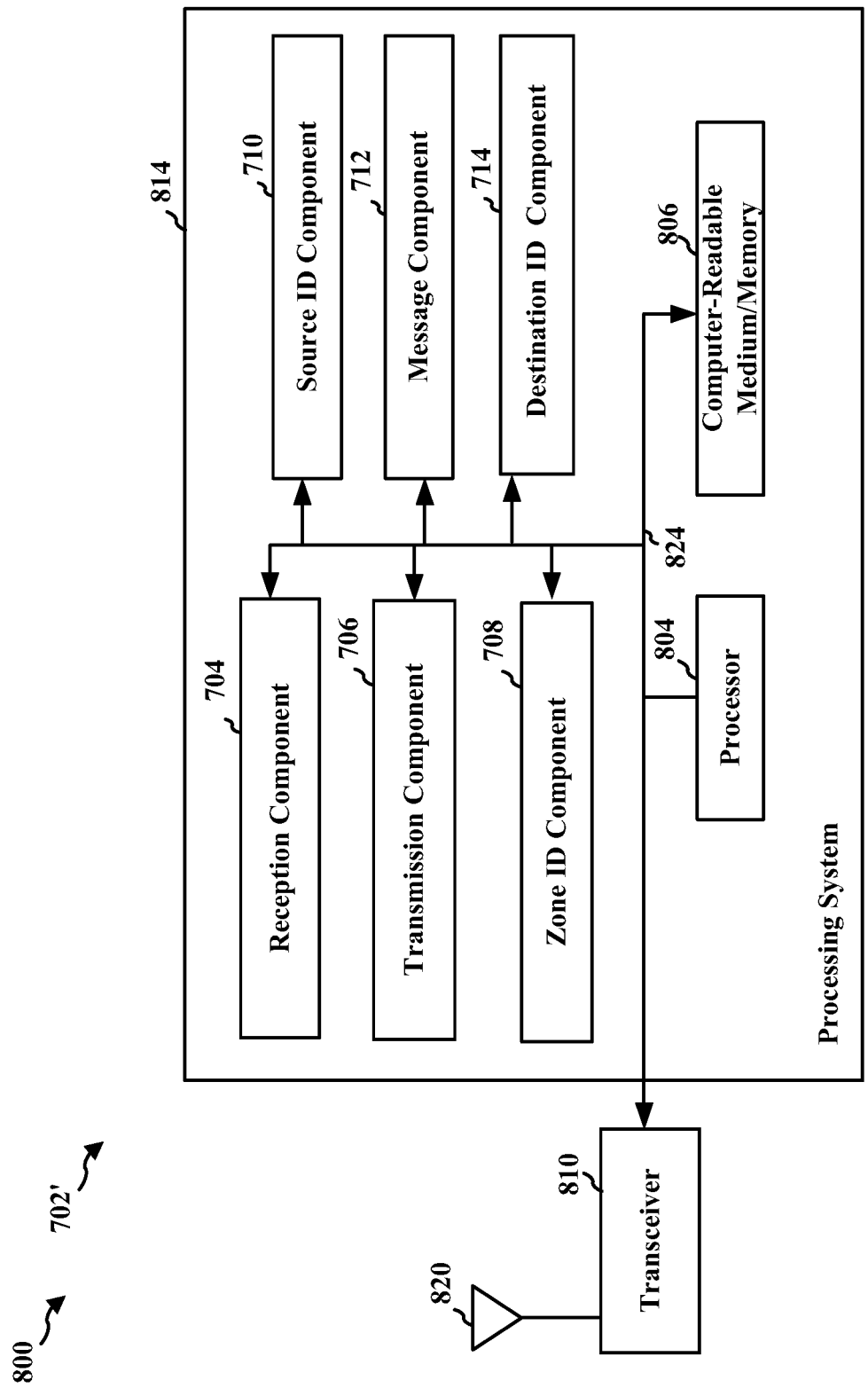
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714 and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 706, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714. The components may be software components running in the processor 804, resident/stored in the computer readable medium/memory 806, one or more hardware components coupled to the processor 804, or some combination thereof In one configuration, the processing system 814 may be a component of the device 350 and may include the memory 360 and/or at least one of the TX processor 368, the RX processor 356, and the controller/processor 359. Alternatively, the processing system 814 may comprise the entire UE.

In one configuration, the apparatus 702/702' for wireless communication includes means for determining a zone ID for the apparatus (the transmitting device). The apparatus may include means for generating a message including the zone ID. The apparatus may include means for transmitting the message directly to at least one receiving device. The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
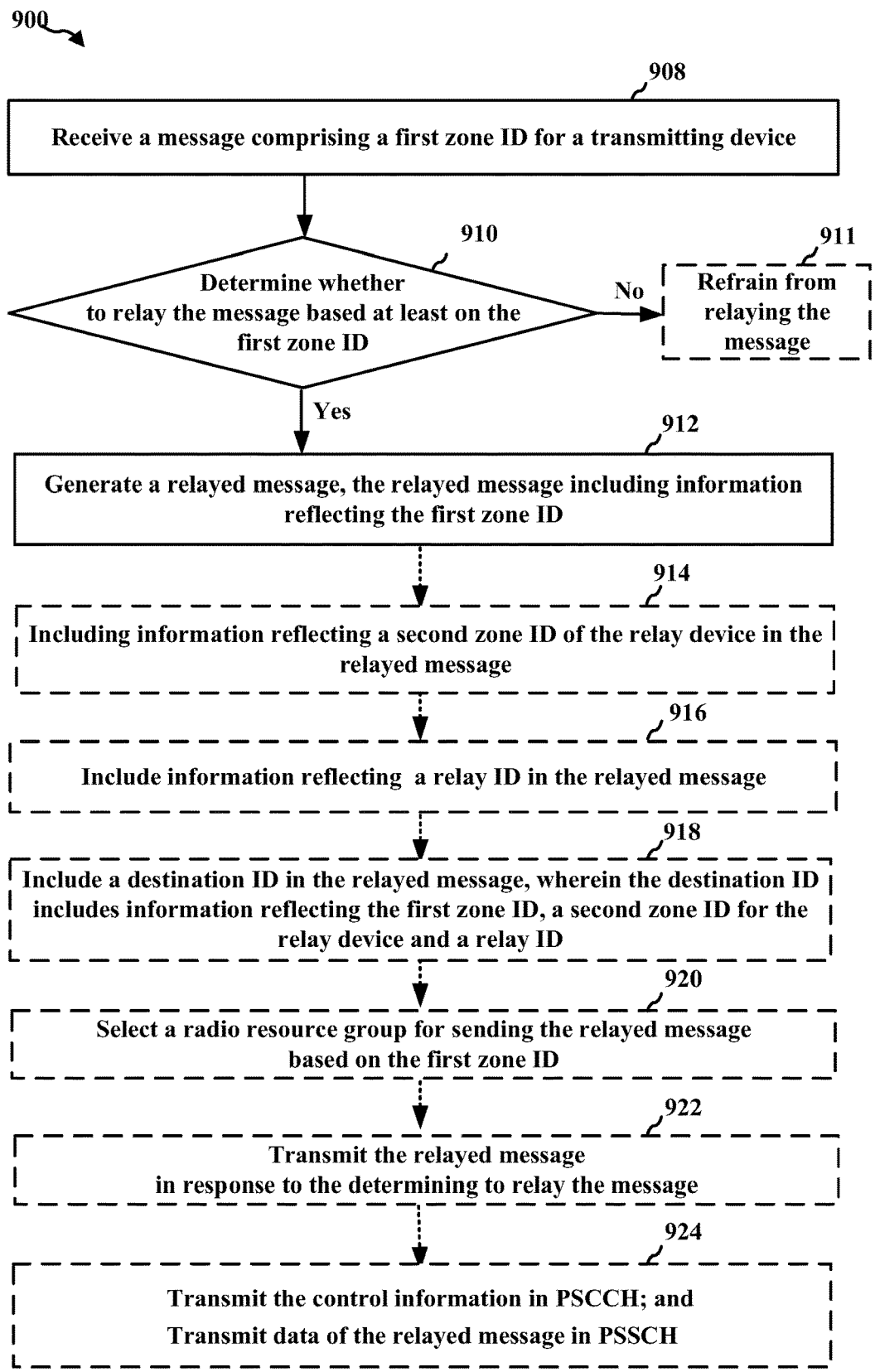
FIG. 9 is a flowchart of a method of wireless communication.

FIG. 9 is a flowchart 900 of a method of wireless communication at a relay device.

The method may be performed, for example, by a relay (e.g., UE 104", 406, 408, 506, 750, the apparatus 1002/1002'; processing system 1114, which may include memory 360/376 and which may be an entire UE or a component of a UE, such as TX processor 368/316, RX processor 356/370, and/or the controller processor 359/375) communicating with a transmitting UE (e.g., UE 104; transmitting device 402, 502', etc.) and a receiving UE (e.g., UE 104; receiving device 404, 504, etc.) in a wireless communication. The relay device may comprise a vehicle or a device installed in a vehicle. To facilitate an understanding of the techniques and concepts described herein, the method of flowchart 900 may be discussed with reference to the examples illustrated in FIGS. 4-5. Optional aspects may be illustrated in dashed lines.

At 908, the relay device may receive a message comprising a first zone ID for a transmitting UE. The message may be received, e.g., by reception component 1004 of apparatus 1002. The message may be received directly from the transmitting UE, for example. The message may be based on eV2X, V2V, V2X, or D2D communication.

At 910, the relay device may determine whether to relay the message based at least on the first zone ID. The determination may be performed, e.g., by determination component 1008 of apparatus 1002. Based on the first zone ID information in the MAC or SDAP header of the message, the relay may decide on the actions, e.g. whether to relay the message, and to map the first zone ID to a new destination ID if the relay decides to relay. In some aspects, the relay may determine to relay the message when the relay is located in a different zone than a zone corresponding to the first zone ID in the message. In some aspects, the relay may determine not to relay the message when the relay is located in a same zone as a zone corresponding to the first zone ID in the first message. By using the zone ID of the transmitting device to determine whether to relay a message, relay devices can avoid relaying messages for transmitting devices that are likely to achieve a similar level of coverage. This can avoid the over replication of messages and can improve the efficient use of wireless resources.

At 912, if the relay device determines to relay the first message, the relay may generate a relayed message, where the relayed message includes information reflecting the first zone ID. The message may be generated, e.g., by message component 1010 of apparatus 1002. In some aspects, the generating the relayed messaged may further comprise including information reflecting a second zone ID of the relay in the relayed message, as illustrated at 914. The second zone ID may be included, e.g., by second zone ID component 1012. In some aspects, generating the relayed messaged may further comprise including information reflecting a relay ID in the relayed message, as illustrated at 916. The relay ID may be included, e.g., by relay ID component 1014. In some aspects, generating the relayed messaged may further comprise including a second destination ID in the relayed message, where the second destination ID may include information reflecting the first zone ID, the second zone ID for the relay and the relay ID, as illustrated at 918. The destination ID may be included by destination ID component 1016 of apparatus 1002.

In some aspects, the information reflecting the first zone ID may be included in control information for the relayed message. In some aspects, the information reflecting the first zone ID may be indicated in a scheduling assignment for the relayed message. In some aspects, the information reflecting the first zone ID is indicated in a MAC header of the relayed message.

In some aspects, the relay device may select a radio resource group for sending the relayed message based on the first zone ID comprised in the message, as illustrated at 920. The relay may use a different radio resources group for messages from different zones.

At 922, the relay 506 may transmit the relayed message including information reflecting the first zone ID in response to the determining to relay the message. The transmission of the relayed message may be performed, e.g., by transmission component 1006 of apparatus 1002. In some aspects, the information reflecting the first zone ID may be included in control information for the relayed message, where the transmitting the relayed message comprises transmitting the control information in the PSCCH, and transmitting data of the relayed message in the PSSCH.

Figure 10:
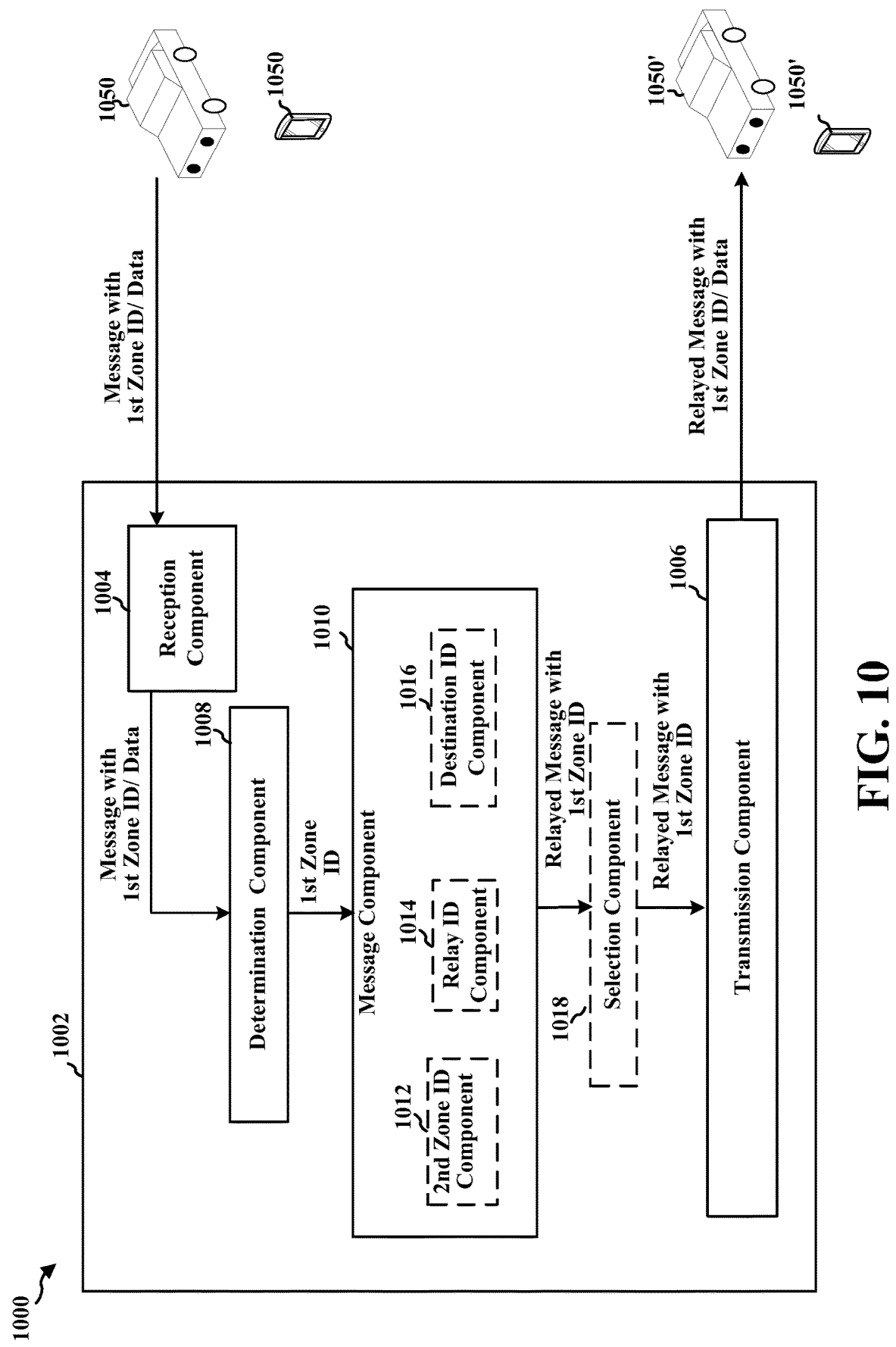
FIG. 10 is a conceptual data flow diagram illustrating the data flow between different means/components in an example apparatus.

FIG. 10 is a conceptual data flow diagram 1000 illustrating the data flow between different means/components in an example apparatus 1002. The apparatus may be a relay (e.g., UE 104", 406, 408, 506, the apparatus 1002/1002', etc.) communicating with a transmitting UE (e.g., UE 104; transmitting device 402, 502, 1050; the apparatus 702/702', etc.)

and a receiving UE (e.g., UE 104; receiving device 404, 504, 1050'; the apparatus 1302/1302', etc.) in a wireless communication. The wireless communication may comprise a eV2X, V2X, V2V, or D2D communication, as described herein. The apparatus may comprise a component of a UE or an entire UE.

The apparatus includes a reception component 1004 that receives a message comprising a first zone ID for a transmitting device, e.g., as described in connection with 510, 908.

The apparatus includes a determination component 1008 that determines whether to relay the message based at least on the first zone ID, e.g., as described in connection with 513, 910. In some aspects, the relay may determine to relay the message when the relay is located in a different zone than a zone corresponding to the first zone ID in the message. In some aspects, the relay may determine not to relay the message when the relay is located in a same zone as a zone corresponding to the first zone ID in the first message.

The apparatus includes a message component 1010 that generates a relayed message, where the relayed message includes information reflecting the first zone ID, e.g., as described in connection with 515, 912. In some aspects, the message component 1010 further comprises a second zone ID component 1012 that includes a second zone ID of the relay in the relayed message. In some aspects, the message component 1010 further comprises a relay ID component 1014 that includes a relay ID of the relay in the relayed message. In some aspects, the message component 1010 further comprises a second destination ID 1016 that includes a second destination ID of the relay in the relayed message.

In some aspects, the information reflecting the first zone ID may be included in control information for the relayed message. In some aspects, the information reflecting the first zone ID may be indicated in a scheduling assignment for the relayed message. In some aspects, the information reflecting the first zone ID is indicated in a MAC header of the relayed message.

The apparatus may include a selection component 1018 that selects a radio resource group for sending the relayed message based on the first zone ID comprised in the message. The relay device may use a different radio resources group for messages from different zones.

The apparatus may include a transmission component 1006 that transmits the relayed message including information reflecting the first zone ID in response to the determining to relay the message. In some aspects, the information reflecting the first zone ID is included in control information for the relayed message, where the transmitting the relayed message comprises transmitting the control information in the PSCCH, and transmitting data of the relayed message in the PSSCH.

The apparatus may include additional components that perform each of the blocks of the algorithm in the aforementioned flowcharts of FIGS. 4, 5 and 9. As such, each block in the aforementioned flowcharts of FIGS. 4, 5 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
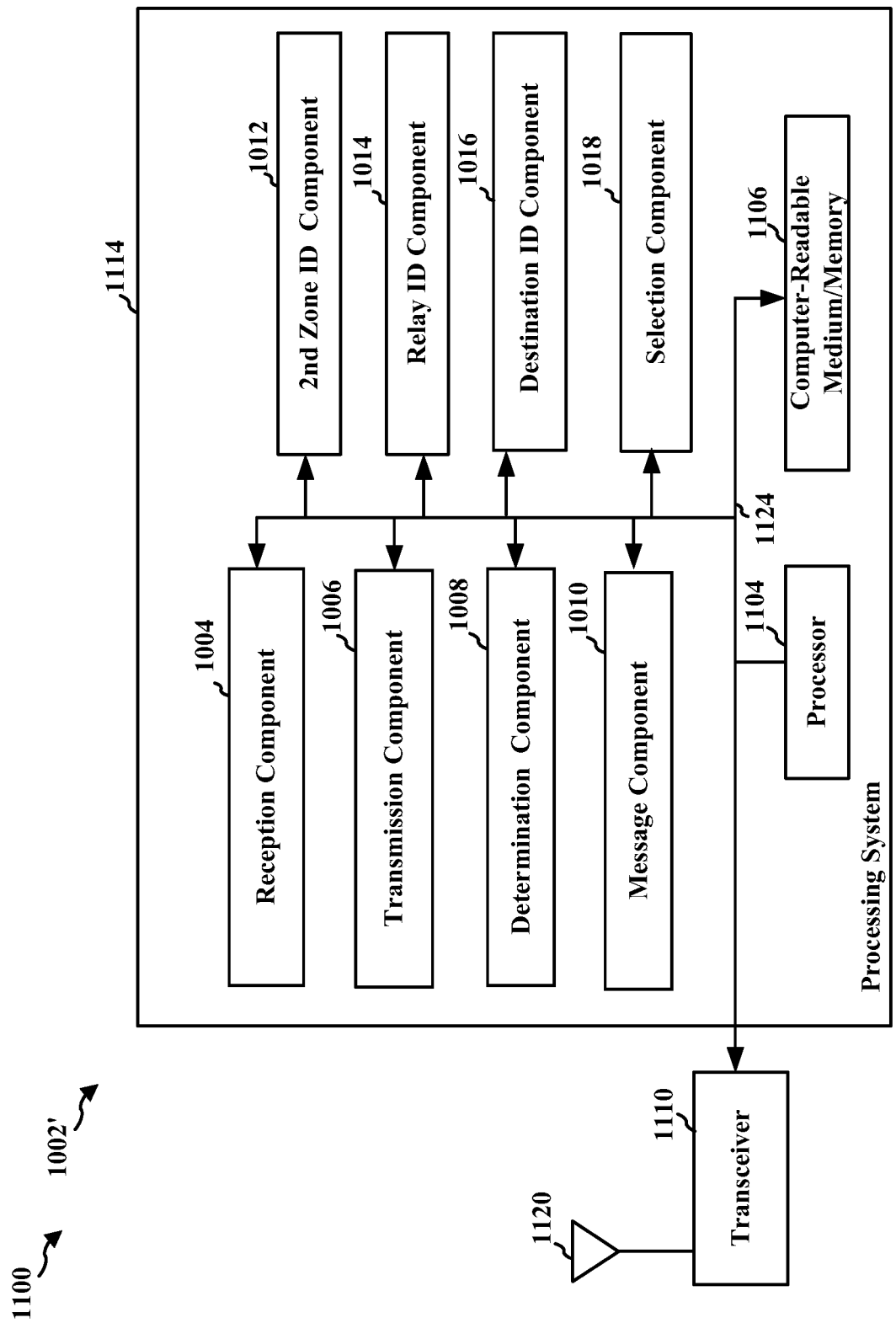
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, 1016, 1018 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014, 1016, 1018. The components may be software components running in the processor 1104, resident/stored in the computer readable medium/memory 1106, one or more hardware components coupled to the processor 1104, or some combination thereof. In one configuration, the processing system 1114 may be a component of the device 350 and may include the memory 360 and/or at least one of the TX processor 368, the RX processor 356, and the controller/processor 359. Alternatively, the processing system 814 may comprise the entire UE.

In one configuration, the apparatus 1002/1002' for wireless communication includes means for receiving a message comprising a first zone identifier (ID) for a transmitting device. The apparatus may include means for determining whether to relay the message based at least on the first zone ID. The apparatus may include means for generating a relayed message, the relayed message including information reflecting the first zone ID. The apparatus may include means for transmitting the message comprising the indication of the zone ID. The apparatus may include means for including second information indicating a second zone ID of the relay device in the relayed message. The apparatus may include means for including additional information indicating a relay device ID in the relayed message. The apparatus may include means for selecting a radio resource group for sending the relayed message based on the first zone ID comprised in the message. The apparatus may include means for including a destination ID in the relayed message, wherein the destination ID is based on the first zone ID, a second zone ID for the relay device and a relay device ID.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
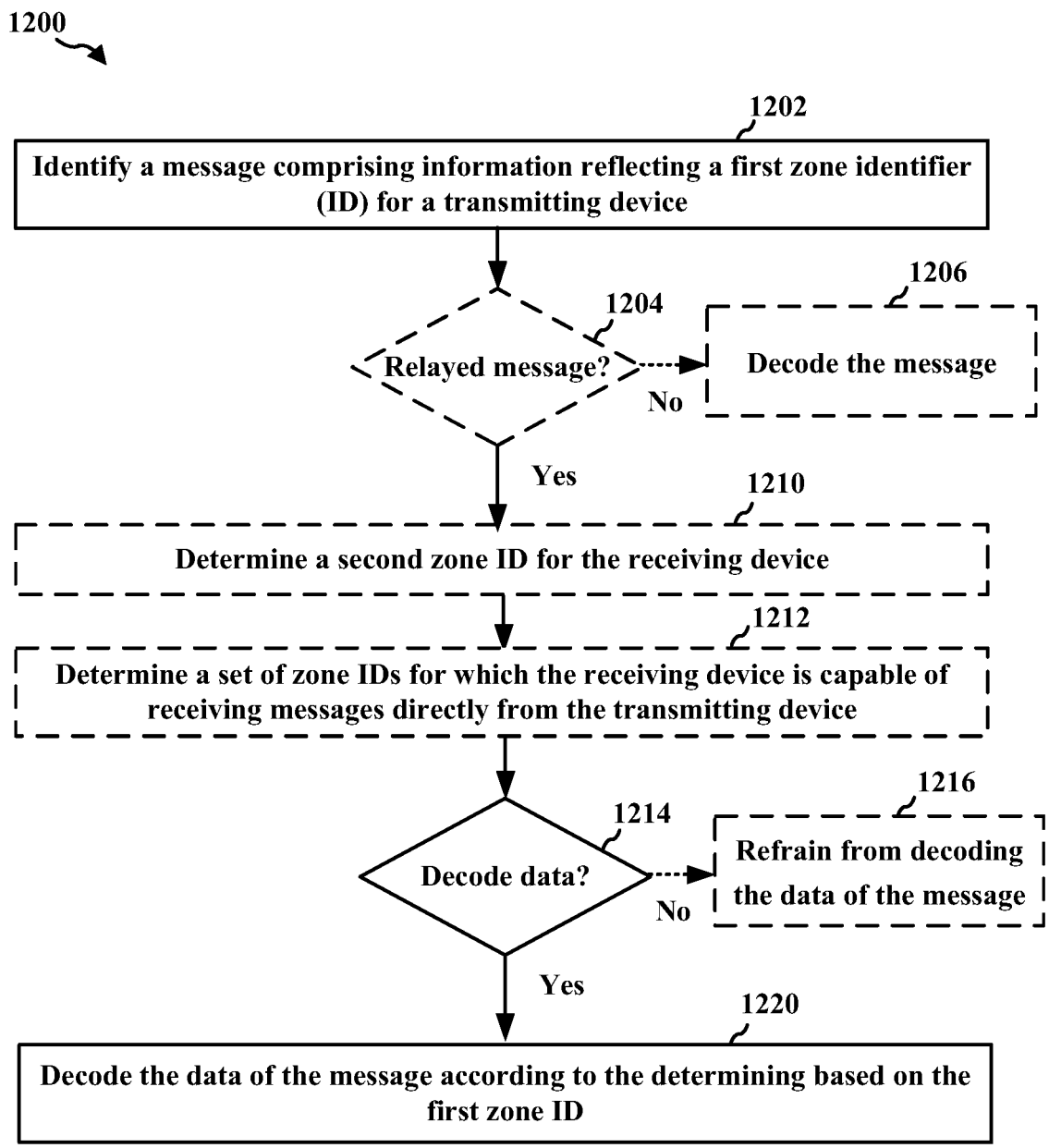
FIG. 12 is a flowchart of a method of wireless communication.

FIG. 12 is a flowchart 1200 of a method of wireless communication at a receiving device. The method may be performed, for example, by a receiving UE (e.g., UE 104; receiving device 404, 504, 1050'; the apparatus 1302/1302', processing system 1414, which may include memory 360/376 and which may be an entire UE or a component of a UE, such as TX processor 368/316, RX processor 356/370, and/or the controller processor 359/375) communicating with a transmitting UE (e.g., UE 104; transmitting device 402, 502, 1050; the apparatus 702/702', etc.) and a relay (e.g., UE 104", 406, 408, 506, 750, the apparatus 1002/1002', etc.) in a wireless communication. The wireless communication may comprise eV2X, V2V, V2X, or D2D communication. The receiving UE may comprise a vehicle or a device installed in a vehicle. To facilitate an understanding of the techniques and concepts described herein, the method of flowchart 1200 may be discussed with reference to the examples illustrated in FIGS. 4-5. Optional aspects may be illustrated in dashed lines.

At 1202, the receiving device may identify a message comprising information reflecting a first zone ID for the transmitting device. The identification may be performed, e.g., by reception component 1204 of apparatus 1202. The message may be an original message, or a relayed message from a relay device. The message may comprise a message similar to messages 410, 412, 414, 510, 520.

The receiving device may determine, e.g., at 1204, whether the message is a relayed message. The determination may be performed, e.g., by determination component 1308 of apparatus 1302. If the message is a relayed message, the receiving device may proceed to make determinations about whether to decode the relayed message. If the message is determined to be, e.g., an original message that is not relayed, the UE may proceed, at 1206, to decode the message. The transmission may be performed, e.g., by transmission component 1306 of apparatus 1302.

At 1214, the receiving device may determine whether to decode data of the message based at least on the first zone ID for the transmitting device. The determination may be performed, e.g., by determination component 1308 of apparatus 1302. The determination may be based on aspects described in connection with 535 in FIG. 5. The use of the zone ID of the transmitting device to determine whether to decode the message enables the receiving device to filter relayed messages for which the UE likely to receive the same message directly from the transmitting device. This enables the receiving to avoid unnecessary processing.

In some aspects, the receiving device may further determine a receiving zone ID for the receiving device, as illustrated at 1210. The determination may be performed, e.g., by receiving device zone ID component 1310 of apparatus 1302. The receiving device 504 may determine to refrain from decoding the data of the message at 1216, e.g., when the message comprises a relayed message and the first zone ID is the same as the receiving zone ID. On the other hand, the receiving UE may determine to decode the data of the message when the message comprises a relayed message and the first zone ID is different than the receiving zone ID. In some aspects, the step of identifying the message comprises receiving control information for the message, where the control information includes the information reflecting the first zone ID.

In some aspects, the message comprises a relayed message and the information reflecting the first zone ID is indicated in a scheduling assignment for the relayed message. In some aspects, the information reflecting the first zone ID is comprised in control information received in a PSCCH.

In some aspects, the receiving device may further determine a set of zone IDs for which the receiving device is capable of receiving messages directly from the transmitting device, as illustrated at 1212. For example, the set of zone IDs may be determined by set of zone ID component 1312 of apparatus 1302. The receiving device may determine to refrain from decoding data of the message, at 1216, e.g., when the message comprises a relayed message and the set of zone IDs comprises the first zone ID. In some aspects, the receiving device may determine whether to decode data of the message further based on a radio resource group on which the message is received. In some aspects, the first zone ID is included in a MAC header or an SDAP header of the message.

In some aspects, the receiving device may determine whether to decode data of the message further based on the second zone ID for the relay and whether the message comprises a relayed message from the relay. For example, the receiving device may determine whether to decode data of the message further based on whether the second zone ID is the same as the first zone ID. In some aspects, the receiving device may determine whether to decode data of the message further based on the relay ID of the relay device and whether the message comprises a relayed message from the relay UE.

At 1220, the receiving device may decode or refrain from decoding the data of the message according to the determining based on the first zone ID. The decoding may be performed, e.g., by decode component 1314 of apparatus 1302 based on the determination by determination component 1308.

Figure 13:
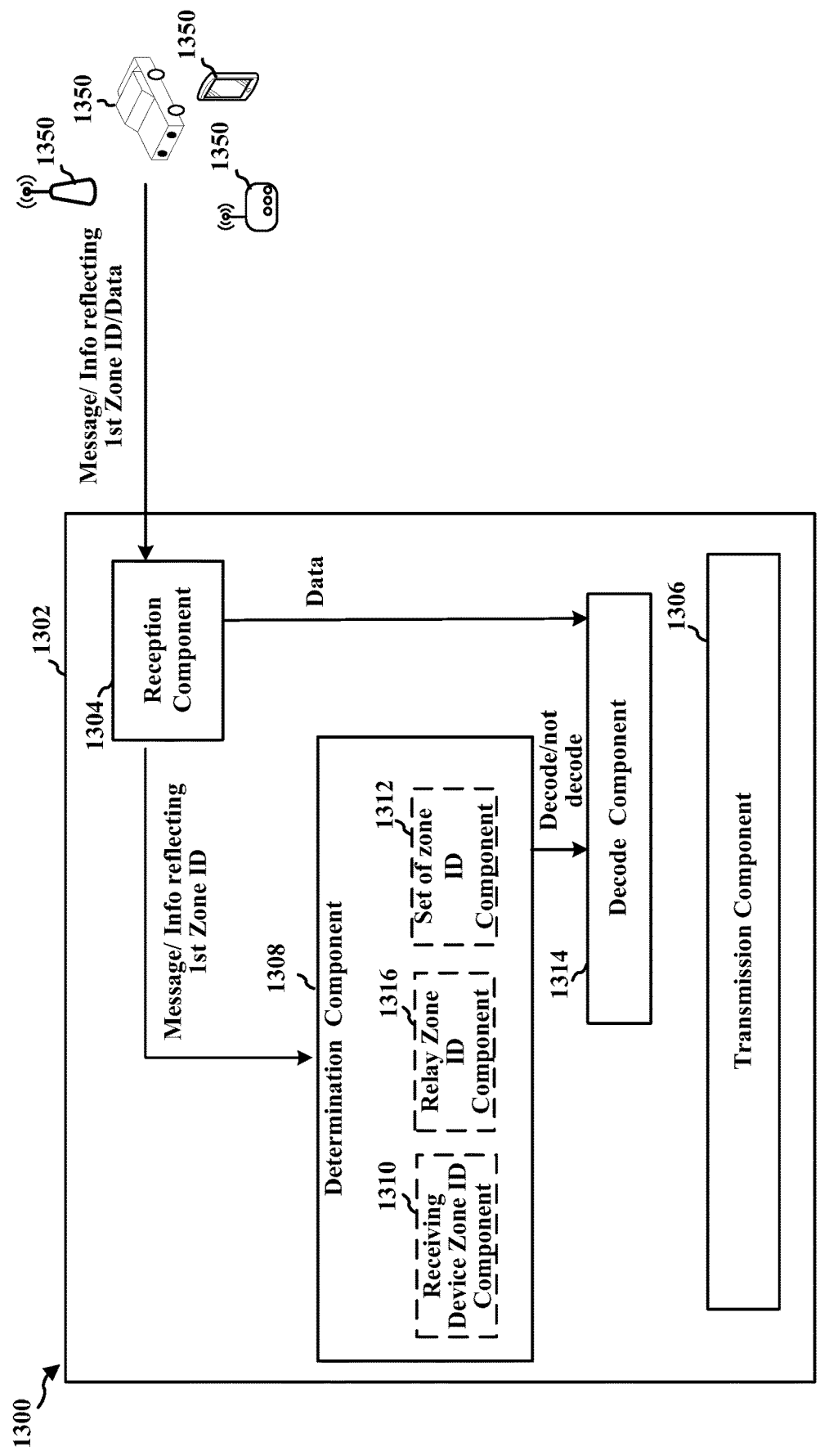
FIG. 13 is a conceptual data flow diagram illustrating the data flow between different means/components in an example apparatus.

FIG. 13 is a conceptual data flow diagram 1300 illustrating the data flow between different means/components in an example apparatus 1302. The apparatus may be a receiving UE (e.g., UE 104; receiving device 404, 504, 1050'; the apparatus 1302/1302', etc.) communicating with a transmitting UE or a relay 1350 in a wireless communication. The wireless communication may comprise a eV2X, V2X, V2V, or D2D communication, as described herein. The apparatus may comprise a component of a UE or an entire UE.

The apparatus includes a reception component 1304 that receives a message comprising information reflecting a first zone ID for the transmitting device, e.g., as described in connection with 533, 1202. The message may be an original message from the transmitting device, or a relayed message from the relay UE.

The apparatus includes a determination component 1308 that determines whether to decode data of the message based at least on the first zone ID for the transmitting device, e.g., as described in connection with 535, 1214. In some aspects, the apparatus may further include a receiving zone ID component 1310 that determines a receiving zone ID for the receiving device, e.g., as described in connection with 1210. The receiving device may determine to refrain from decoding the data of the message when the message comprises a relayed message and the first zone ID is the same as the receiving zone ID. On the other hand, the receiving UE may determine to decode the data of the message when the message comprises a relayed message and the first zone ID is different than the receiving zone ID.

In some aspects, the apparatus may further include a set of zone ID component 1312 that determines a set of zone IDs for which the receiving device is capable of receiving messages directly from the transmitting device, e.g., as described in connection with 1212. The receiving device may determine to refrain from decoding data of the message when the message comprises a relayed message and the set of zone IDs comprises the first zone ID. In some aspects, the receiving device may determine whether to decode data of the message further based on a radio resource group on which the message is received. In some aspects, the first zone ID is included in a MAC header or an SDAP header of the message.

In some aspects, the apparatus may further include a relay zone ID component 1316 that determines a relay zone ID. In some aspects, the receiving device may determine whether to decode data of the message further based on the relay zone ID for the relay and whether the message comprises a relayed message from the relay. For example, the receiving device may determine whether to decode data of the message further based on whether the relay zone ID is the same as the first zone ID. In some aspects, the receiving device may determine whether to decode data of the message further based on the relay ID of the relay and whether the message comprises a relayed message from the relay.

The apparatus includes a decode component 1314 that decodes the data of the message according to the determining based on the first zone ID. The apparatus may include a transmission component 1306 that transmits messages.

The apparatus may include additional components that perform each of the blocks of the algorithm in the aforementioned flowcharts of FIGS. 4, 5 and 12. As such, each block in the aforementioned flowcharts of FIGS. 4, 5 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
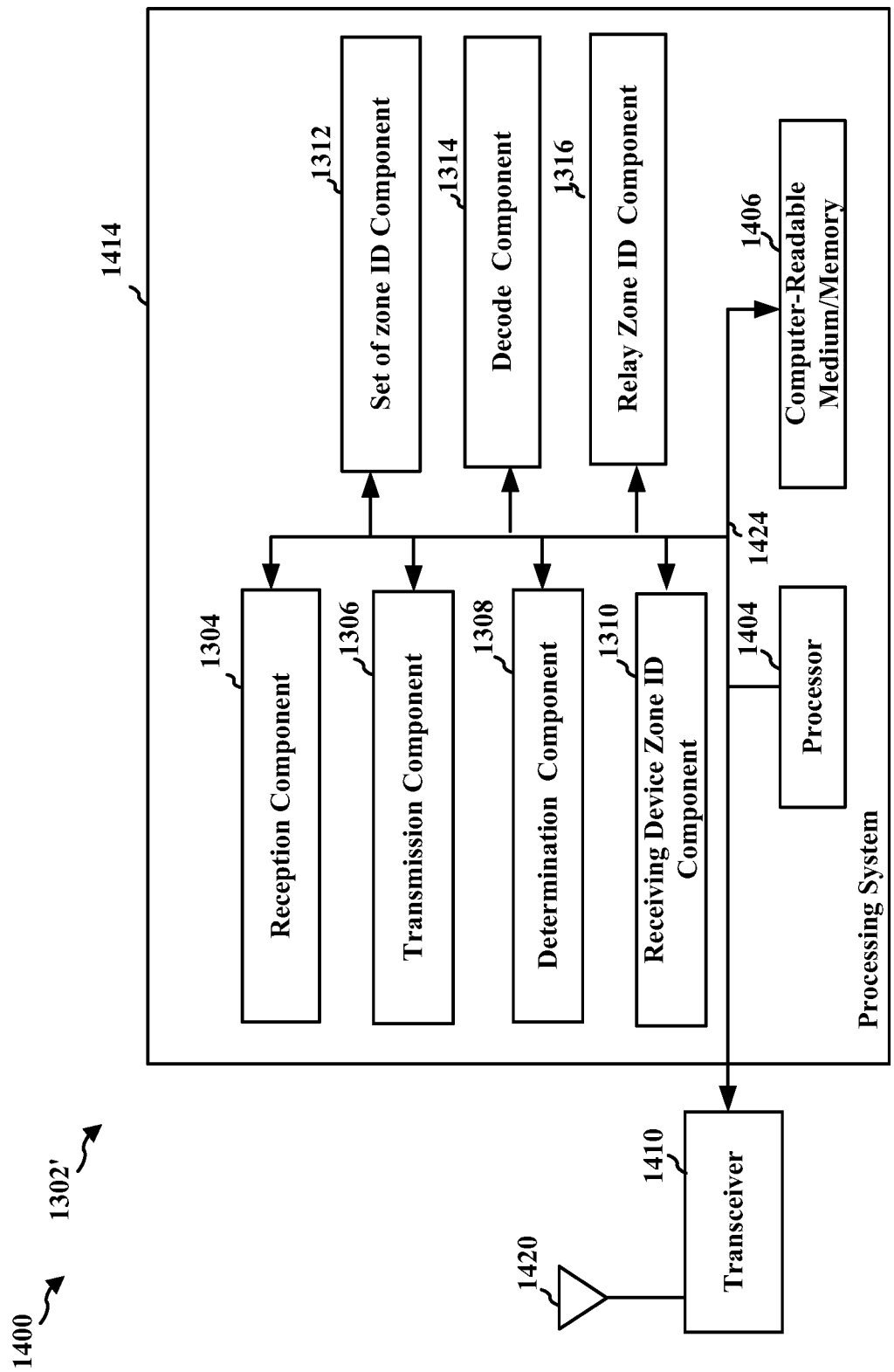
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, 1312, 1314, 1316 and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1306, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310, 1312, 1314, 1316. The components may be software components running in the processor 1404, resident/stored in the computer readable medium/memory 1406, one or more hardware components coupled to the processor 1404, or some combination thereof. In one configuration, the processing system 1414 may be a component of the device 350 and may include the memory 360 and/or at least one of the TX processor 368, the RX processor 356, and the controller/processor 359. Alternatively, the processing system 814 may comprise the entire UE.

In one configuration, the apparatus 1302/1302' for wireless communication includes means for identifying a message comprising information reflecting a first zone ID for a transmitting device. The apparatus may include means for determining whether the message comprises a relayed message. The apparatus may include means for determining whether to decode data of the message based at least on the first zone ID for the transmitting device. The apparatus may include means for decoding or refraining from decoding the data of the message according to the determining based on the first zone ID. The apparatus may include means for determining a second zone ID for the receiving device, and the means for determining whether to decode the message may refrain from decoding the message when the message comprises a same zone ID as the second zone ID of the receiving device. The apparatus may further include means for determining a set of zone IDs for which the receiving device is capable of receiving messages directly from the transmitting device. The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Any of the aspects in the following examples may be combined with any of the aspects of the previous discussions and/or embodiments described herein, without limitation.

Example 1 is a method of wireless communication at a transmitting device, comprising determining an ID for the transmitting device, generating a message including the zone ID, and transmitting the message directly to at least one receiving device. In Example 2, the method of example 1 further includes that the message is transmitted based on V2V communication or V2X, or D2D communication. In Example 3, the method of any of examples 1-2 further includes that the zone ID is included in a MAC header of the message. In Example 4, the method of any of examples 1-3 further includes that the zone ID is included in a SDAP header of the message. In Example 5, the method of any of examples 1-4 further includes that the determining the zone ID for the transmitting device comprises determining a geographical location of the transmitting device, and converting the geographical location into the zone ID. In Example 6, the method of any of examples 1-5 further includes that the geographical location is converted into the zone ID based on a preconfigured relationship. In Example 7, the method of any of examples 1-6 further includes that the geographical location is converted into the zone ID based on information received from a base station. In Example 8, the method of any of examples 1-7 further includes that the geographical location is converted into the zone ID based on information received from a relay device. In Example 9, the method of any of examples 1-8 further includes that, in addition to the zone ID, the message further comprises a layer 2 ID based on at least one of a source ID and a destination ID. In Example 10, the method of any of examples 1-9 further includes that the source ID comprises a layer 2 ID of the transmitting device, and the destination ID comprises a broadcast group ID. In Example 11, the method of any of examples 1-10 further includes that the message further comprises an indicator that indicates whether the message should be relayed. In Example 12, the method of any of examples 1-11 further includes that the message further comprises a designation of a relay device that is intended to forward the message. In Example 13, the method of any of examples 1-12 further includes that the zone ID is included in control information of the message.

Example 14 is a system or apparatus including means for implementing a method or realizing an apparatus as in any of examples 1-13.

Example 15 is a device including one or more processors and memory in electronic communication with the one or more processors storing instructions executable by the one or more processors to cause the system or apparatus to implement a method as in any of examples 1-13.

Example 16 is a non-transitory computer readable medium storing instructions executable by one or more processors to cause the one or more processors to implement a method as in any of examples 1-13.

Example 17 is a method of wireless communication at a relay device, comprising receiving a message comprising a first ID for a transmitting device, determining whether to relay the message based at least on the first zone ID, and if the relay device determines to relay the message, generating a relayed message, the relayed message including information reflecting the first zone ID. In Example 18, the method of example 17 further includes that the relay device determines to relay the message when the relay device is located in a different zone than a zone corresponding to the first zone ID in the message. In Example 19, the method of any of examples 17-18 further includes that generating the relayed messaged further comprises including information reflecting a second zone ID of the relay device in the relayed message. In Example 20, the method of any of examples 17-19 further includes that generating the relayed messaged further comprises information reflecting a relay device ID in the relayed message. In Example 21, the method of any of examples 17-20 further includes that the information reflecting the first zone ID is included in control information for the relayed message. In Example 22, the method of any of examples 17-21 further includes that the information reflecting the first zone ID is indicated in a scheduling assignment for the relayed message. In Example 23, the method of any of examples 17-22 further includes that the information reflecting the first zone ID is included in a MAC header of the relayed message. In Example 24, the method of any of examples 17-23 further includes that selecting a radio resource group for sending the relayed message based on the first zone ID comprised in the message. In Example 25, the method of any of examples 17-24 further includes that the message is received based on V2V communication, V2X, or D2D communication. In Example 26, the method of any of examples 17-25 further includes that generating the relayed messaged further comprises: including a destination ID in the relayed message, wherein the destination ID includes information reflecting the first zone ID, a second zone ID for the relay device and a relay device ID. In Example 27, the method of any of examples 17-26 further includes transmitting the relayed message in response to the determining to relay the message. In Example 28, the method of any of examples 17-27 further includes that the information reflecting the first zone ID is included in control information for the relayed message, wherein the transmitting the relayed message comprises: transmitting the control information in a PSCCH; and transmitting data of the relayed message in a PSSCH.

Example 29 is a system or apparatus including means for implementing a method or realizing an apparatus as in any of examples 17-28.

Example 30 is a device including one or more processors and memory in electronic communication with the one or more processors storing instructions executable by the one or more processors to cause the system or apparatus to implement a method as in any of examples 17-28.

Example 31 is a non-transitory computer readable medium storing instructions executable by one or more processors to cause the one or more processors to implement a method as in any of examples 17-28.

Example 32 is a method of wireless communication at a receiving device, comprising: identifying a message comprising information reflecting a first ID for a transmitting device, determining whether the messages comprises a relayed message, determining whether to decode data of the message based at least on the first zone ID for the transmitting device, and decoding or refraining from decoding the data of the message according to the determining based on the first zone ID. In Example 33, the method of example 32 further includes determining a second zone ID for the receiving device, wherein determining whether to decode the data of the message comprises: refraining from decoding the data of the message when the message comprises a relayed message and the first zone ID is the same as the second zone ID. In Example 34, the method of any of examples 32-33 further includes that the identifying the message comprising information reflecting the first zone ID comprises: receiving control information for the message, the control information including the information reflecting the first zone ID. In Example 35, the method of any of examples 32-34 further includes determining a set of zone IDs for which the receiving device is capable of receiving messages directly from the transmitting device, wherein the determining whether to decode the data of the message comprises: refraining from decoding the data of the message when the message comprises a relayed message and the set of zone IDs comprises the first zone ID. In Example 36, the method of any of examples 32-35 further includes that the receiving device determines whether to decode the data of the message further based on a radio resource group on which the message is received. In Example 37, the method of any of examples 32-36 further includes that the information reflecting the first zone ID is included in a MAC header of the message. In Example 38, the method of any of examples 32-37 further includes that the first zone ID is included in an SDAP header of the message. In Example 39, the method of any of examples 32-38 further includes that the message comprises a relayed message and the information reflecting the first zone ID is indicated in a scheduling assignment for the relayed message. In Example 40, the method of any of examples 32-39 further includes that the information reflecting the first zone ID is comprised in control information received in a physical sidelink control channel (PSCCH). In Example 41, the method of any of examples 32-40 further includes that the message is received based on V2V communication, V2X communication, or D2D communication. In Example 42, the method of any of examples 32-41 further includes that the receiving device determines whether to decode the data of the message further based on a second zone ID for a relay device and whether the message comprises a relayed message from the relay device. In Example 43, the method of any of examples 32-42 further includes that the receiving device determines whether to decode the data of the message further based on whether the second zone ID is the same as the first zone ID. In Example 44, the method of any of examples 32-43 further includes that the receiving device determines whether to decode the data of the message further based on a relay device ID of a relay device and whether the message comprises a relayed message from the relay device.

Example 45 is a system or apparatus including means for implementing a method or realizing an apparatus as in any of examples 32-44.

Example 46 is a device including one or more processors and memory in electronic communication with the one or more processors storing instructions executable by the one or more processors to cause the system or apparatus to implement a method as in any of examples 32-44.

Example 47 is a non-transitory computer readable medium storing instructions executable by one or more processors to cause the one or more processors to implement a method as in any of examples 32-44.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a transmitting device, comprising:
    determining a sidelink zone identifier (ID) for a geographic area in which the transmitting device is located, the sidelink zone ID corresponding to the geographic area that is bounded by a zone boundary; and
    transmitting a sidelink message that comprises the sidelink zone ID, the sidelink zone ID indicating for a receiving user equipment (UE) to skip at least one of decoding or relaying the sidelink message if the receiving UE is in a same zone indicated by the sidelink zone ID.

2. The method of claim 1, wherein the sidelink zone ID is included in at least one of a Medium Access Control (MAC) header of the sidelink message or a service data adaptation protocol (SDAP) header of the sidelink message.

3. The method of claim 1, wherein the determining the sidelink zone ID for the transmitting device comprises:
    determining a geographical location of the transmitting device; and
    converting the geographical location into the sidelink zone ID.

4. The method of claim 3, wherein the geographical location is converted into the sidelink zone ID based on at least one of a preconfigured relationship or information received from a base station or a relay device.

5. The method of claim 1, wherein, in addition to the sidelink zone ID, the sidelink message further comprises a layer 2 ID based on at least one of a source ID and a destination ID.

6. The method of claim 5, wherein the source ID comprises the layer 2 ID of the transmitting device, and the destination ID comprises a broadcast group ID.

7. The method of claim 1, wherein the sidelink message further comprises an indicator that indicates whether the sidelink message should be relayed.

8. The method of claim 1, wherein the sidelink message further comprises a designation of a relay device that is intended to forward the sidelink message.

9. The method of claim 1, wherein the sidelink zone ID is included in control information of the sidelink message.

10. The method of claim 1, wherein the sidelink message is transmitted based on vehicle-to-vehicle (V2V) communication, vehicle-to-everything (V2X) communication, or device-to-device communication.

11. A method of wireless communication at a relay device, comprising:
receiving a sidelink message comprising a first zone identifier (ID) for a transmitting device;
transmitting a relayed message if the relay device is located in a different zone than a zone corresponding to the first zone ID in the sidelink message, the relayed message including first information indicating the first zone ID; and
skipping relaying the sidelink message if the relay device is located in a same zone as the first zone ID.

12. The method of claim 11, wherein the relayed message further includes second information indicating a second zone ID of the relay device in the relayed message.

13. The method of claim 11, wherein the relayed message further includes additional information indicating a relay device ID in the relayed message.

14. The method of claim 11, wherein the first information indicating the first zone ID is comprised in at least one of control information for the relayed message, a scheduling assignment for the relayed message, or a MAC header of the relayed message.

15. The method of claim 11, further comprising:
selecting a radio resource group for sending the relayed message based on the first zone ID comprised in the sidelink message.

16. The method of claim 11, wherein the relayed message further includes a destination ID in the relayed message, wherein the destination ID is based on the first zone ID, a second zone ID for the relay device and a relay device ID.

17. The method of claim 11,
wherein the first information indicating the first zone ID is included in control information for the relayed message, and wherein the transmitting the relayed message comprises:
transmitting the control information in a physical sidelink control channel (PSCCH); and
transmitting data of the relayed message in a physical sidelink shared channel (PSSCH).

18. A method of wireless communication at a receiving device, comprising:
receiving a relayed sidelink message from a relaying device, the relayed sidelink message comprising information indicating a first zone identifier (ID) for a transmitting device that is a source of the relayed sidelink message;
skipping decoding data of the relayed sidelink message if the first zone ID is in a set of one of more zone IDs including a second zone ID of the receiving device; and
decoding the data of the relayed sidelink message if the first zone ID of the transmitting device is not in the set of one or more zone IDs including the second zone ID of the receiving device.

19. The method of claim 18, wherein the set of one or more zone IDs is a single zone ID and the receiving device decodes the data of the relayed sidelink message if the second zone ID for the receiving device is in a different zone as the first zone ID and skips decoding the data of the relayed sidelink message if the relayed sidelink message comprises the relayed message and the first zone ID is in a same zone as the second zone ID.

20. The method of claim 18, wherein receiving the relayed sidelink message further comprises:
receiving control information for the relayed sidelink message, the control information including the information indicating the first zone ID.

21. The method of claim 18, wherein the set of one or more zone IDs corresponds to a set of zone IDs for which the receiving device is capable of receiving messages directly from the transmitting device.

22. The method of claim 18, wherein the receiving device decodes the data of the relayed sidelink message further based on a radio resource group on which the relayed sidelink message is received.

23. The method of claim 18, wherein the information indicating the first zone ID is included in at least one of a MAC header of the relayed sidelink message or an SDAP header of the relayed sidelink message, or control information received in a physical sidelink control channel (PSCCH).

24. The method of claim 18, wherein the information indicating the first zone ID is indicated in a scheduling assignment for the relayed sidelink message.

25. The method of claim 18, wherein the relayed sidelink message is received based on vehicle-to-vehicle (V2V) communication, vehicle-to-everything (V2X) communication, or device-to-device communication.

26. The method of claim 18, wherein the receiving device decodes the data of the relayed sidelink message further based on a third zone ID for a relay device.

27. The method of claim 26, wherein the receiving device decodes the data of the relayed sidelink message further based on whether the third zone ID is a same zone as the first zone ID.

28. The method of claim 18, wherein the receiving device decodes the data of the relayed sidelink message further based on a relay device ID of a relay device.

29. An apparatus for wireless communication at a receiving device, comprising:
a memory; and
at least one processor coupled to the memory and configured to:
receive a relayed sidelink message from a relaying device, the relayed sidelink message comprising information indicating a first zone identifier (ID) for a transmitting device that is a source of the relayed sidelink message;
skip decoding data of the relayed sidelink message if the first zone ID is in a set of one of more zone IDs including a second zone ID of the receiving device; and
decode the data of the relayed sidelink message if the first zone ID of the transmitting device is not in the set of one or more zone IDs including the second zone ID of the receiving device.

* * * * *